United States Patent
Jeong et al.

(10) Patent No.: US 11,853,215 B2
(45) Date of Patent: Dec. 26, 2023

(54) MEMORY CONTROLLER, SYSTEM INCLUDING THE SAME, AND OPERATING METHOD OF MEMORY DEVICE FOR INCREASING A CACHE HIT AND REDUCING READ LATENCY USING AN INTEGRATED COMMAD

(71) Applicant: SAMSUNG ELECTRONICS CO., LTD., Suwon-si (KR)

(72) Inventors: Wonseb Jeong, Hwaseong-si (KR); Heehyun Nam, Seoul (KR); Jeongho Lee, Gwacheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 144 days.

(21) Appl. No.: 17/408,767

(22) Filed: Aug. 23, 2021

(65) Prior Publication Data

US 2022/0164286 A1 May 26, 2022

(30) Foreign Application Priority Data

Nov. 23, 2020 (KR) .......................... 10-2020-0158053

(51) Int. Cl.
| | | |
|---|---|---|
| *G06F 12/08* | (2016.01) | |
| *G06F 12/0806* | (2016.01) | |
| *G06F 12/02* | (2006.01) | |
| *G06F 12/0862* | (2016.01) | |

(52) U.S. Cl.
CPC ...... *G06F 12/0806* (2013.01); *G06F 12/0253* (2013.01); *G06F 12/0862* (2013.01); *G06F 2212/1036* (2013.01)

(58) Field of Classification Search
None
See application file for complete search history.

(56) References Cited

U.S. PATENT DOCUMENTS

| | | | |
|---|---|---|---|
| 9,600,407 B2 | 3/2017 | Faber | |
| 2006/0179236 A1* | 8/2006 | Shafi | G06F 12/1027 |
| | | | 711/137 |
| 2009/0006719 A1* | 1/2009 | Traister | G06F 12/0804 |
| | | | 711/E12.008 |
| 2013/0007395 A1* | 1/2013 | Tanaka | G06F 3/0637 |
| | | | 711/164 |
| 2014/0215129 A1* | 7/2014 | Kuzmin | G06F 12/0246 |
| | | | 711/103 |
| 2015/0169439 A1* | 6/2015 | Torrant | G06F 12/126 |
| | | | 711/103 |
| 2017/0177469 A1* | 6/2017 | Hashimoto | G06F 12/0246 |

(Continued)

*Primary Examiner* — Tracy C Chan
(74) *Attorney, Agent, or Firm* — Sughrue Mion, PLLC

(57) ABSTRACT

A device includes: a first interface circuit configured to communicate with a host processor; a second interface circuit configured to communicate with a memory comprising a plurality of storage regions; a cache memory including a plurality of cache lines configured to temporarily store data; and a controller configured to receive an integrated command from the host processor, the integrated command comprising memory operation information and cache management information, configured to control the memory based on a first command that is instructed according to the memory operation information, and configured to control at least one of the plurality of cache lines based on the cache management information.

20 Claims, 13 Drawing Sheets

(56) References Cited

U.S. PATENT DOCUMENTS

| | | |
|---|---|---|
| 2020/0004685 A1 | 1/2020 | Guim Bernat et al. |
| 2020/0065290 A1 | 2/2020 | Natu |
| 2020/0110537 A1* | 4/2020 | Hahn ................... G06F 3/061 |
| 2020/0167098 A1 | 5/2020 | Shah et al. |
| 2020/0192715 A1 | 6/2020 | Wang et al. |
| 2020/0319882 A1* | 10/2020 | Liang ................ G06F 12/1009 |

* cited by examiner

MEMORY CONTROLLER, SYSTEM INCLUDING THE SAME, AND OPERATING METHOD OF MEMORY DEVICE FOR INCREASING A CACHE HIT AND REDUCING READ LATENCY USING AN INTEGRATED COMMAD

CROSS-REFERENCE TO THE RELATED APPLICATION

This application is based on and claims priority under 35 U.S.C. § 119 to Korean Patent Application No. 10-2020-0158053, filed on Nov. 23, 2020 in the Korean Intellectual Property Office, the disclosure of which is incorporated by reference herein in its entirety.

BACKGROUND

The inventive concept relates to a memory controller, and more particularly, to a memory controller that performs a memory operation and cache management based on a single command, a system including the memory controller, and an operating method of a memory device.

An apparatus configured to process data may perform various operations by accessing a memory. For example, the apparatus may process data read from the memory, or write the processed data to the memory. Due to performance and functions required by a system, various apparatuses that communicate with each other via a link that provides high bandwidth and low latency may be included in the system. The memory included in the system may be shared and accessed by two or more apparatuses. Accordingly, the performance of the system may depend on not only an operating speed of each of the apparatuses, but also communication efficiency between apparatuses, and the time required for accessing the memory.

SUMMARY

The inventive concept provides a system, a device, and an operating method for reduced latency of memory access.

A device according to an embodiment includes: a first interface circuit configured to communicate with a host processor; a second interface circuit configured to communicate with a memory including a plurality of storage regions; a cache memory including a plurality of cache lines configured to temporarily store data; and a controller configured to receive an integrated command from the host processor, the integrated command including memory operation information and cache management information, configured to control the memory based on a first command that is instructed according to the memory operation information, and configured to control at least one of the plurality of cache lines based on the cache management information.

According to an aspect of the inventive concept, there is provided a system including: a host processor including at least one core configured to execute instructions; a device-attached memory including a plurality of storage regions; and a device configured to communicate with the host processor and the device-attached memory, wherein the device includes a cache memory and is further configured to control the cache memory and the device-attached memory based on an integrated command, received from the host processor, the integrated command including a read command for a first piece of data in the device-attached memory and cache management information for the cache memory.

According to another aspect of the inventive concept, there is provided a method of operating a device connected to a host processor via a bus and connected to a device-attached memory, the device-attached memory including a plurality of storage regions, the method including: receiving, from the host processor, an integrated command including memory operation information and cache management information; according to the memory operation information, transmitting a read command for a first piece of data to the device-attached memory; and according to the cache management information, controlling a cache memory included in the device, the cache memory including a plurality of cache lines, wherein the cache management information instructs at least one of a cache keep on a first cache line that temporarily stores the first piece of data among the plurality of cache lines, a cache flush on the first cache line, or prefetching of a second piece of data that is different from the first piece of data.

BRIEF DESCRIPTION OF THE DRAWINGS

Embodiments of the inventive concept will be more clearly understood from the following detailed description taken in conjunction with the accompanying drawings in which.

DETAILED DESCRIPTION

Hereinafter, embodiments of the inventive concept will be described in detail with reference to the accompanying drawings.

Figure 1:
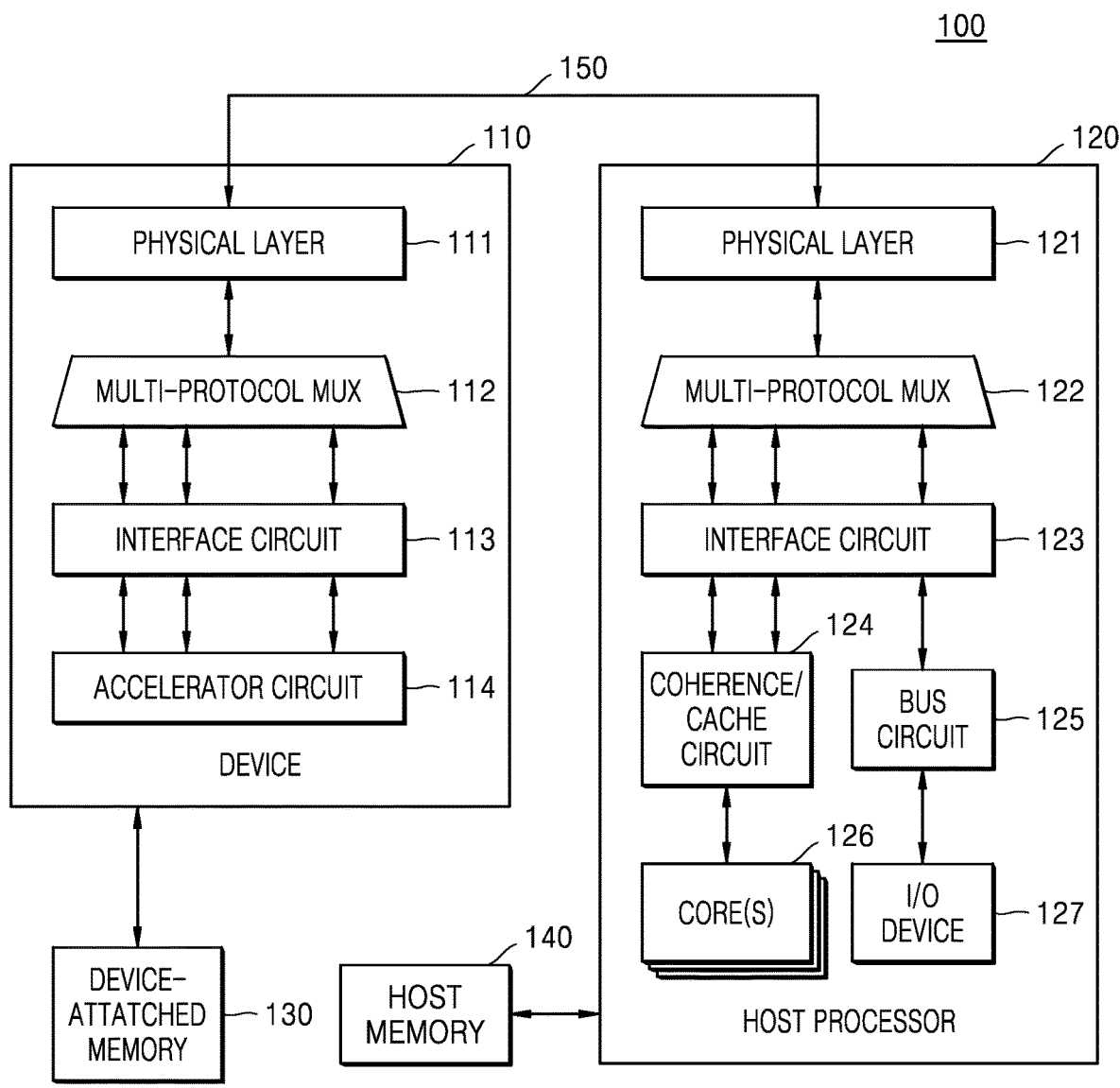
FIG. 1 is a block diagram of a system according to an embodiment.

FIG. 1 is a block diagram of a system 100 according to an embodiment.

Referring to FIG. 1, the system 100 may include any computing system (or components included in a computing system) including a device 110 and a host processor 120 that communicate with each other. For example, the system 100 may be included in a stationary computing system such as a desktop computer, a server, and a kiosk, or in a portable computing system such as a laptop computer, a mobile phone, and a wearable device. In addition, in some embodiments, the system 100 may be included in a system-on-chip (SoC) or a system-in-package (SiP) in which the device 110 and the host processor 120 are implemented in one chip or package. As illustrated in FIG. 1, the system 100 may include the device 110, the host processor 120, a device-attached memory 130, and a host memory 140. According to various embodiments, the system 100 may not include the device-attached memory 130. Referring to FIG. 1, the device 110 and the host processor 120 may communicate with each other via a link 150, and may transmit or receive messages and/or data with each other via the link 150.

Embodiments of the inventive concept will be described with reference to the link 150 based on the compute express link (CXL) specification that supports CXL protocols. However, the device 110 and the host processor 120 may communicate with each other based on, as non-limiting examples, coherent interconnect technologies such as XBus protocol, NVLink protocol, Infinity Fabric protocol, cache coherent interconnect for accelerators (CCIX) protocol, and coherent accelerator processor interface (CAPI).

In some embodiments, the link 150 may support multiple protocols, and may transmit messages and/or data by using the multiple protocols. For example, the link 150 may support the CXL protocols including an incoherent protocol (for example, CXL.io), a coherent protocol (for example, CXL.cache), and a memory access protocol (or a memory protocol) (for example, CXL.mem). In some embodiments, the link 150 may support protocols, as non-limiting examples, such as peripheral component interconnect (PCI), PCI express (PCIe), universal serial bus (USB), and serial advanced technology attachment (SATA). In the inventive concept, the protocol supported by the link 150 may also be referred to as an interconnection protocol.

The device 110 may include any device that provides functions to the host processor 120. In some embodiments, referring to CXL specification 2.0, the device 110 may correspond to an accelerator that supports the CXL specification. For example, software executed by the host processor 120 may offload at least a portion of computing and/or input/output (I/O) operations to the device 110. In some embodiments, the device 110 may include at least one of programmable components such as a graphics processing unit (GPU) and a neural processing unit (NPU), components that provide fixed functions such as an internet protocol (IP) core, and reconfigurable components such as a field programmable gate array (FPGA). As illustrated in FIG. 1, the device 110 may include a physical layer 111, a multi-protocol multiplexer (MUX) 112, an interface circuit 113, and an accelerator circuit 114, and the device-attached memory 130, and may communicate with the device-attached memory 130.

The accelerator circuit 114 may perform functions provided by the device 110 to the host processor 120, and may also be referred to as an accelerator logic. As illustrated in FIG. 1, when the device-attached memory 130 is included in the system 100, the accelerator circuit 114 may communicate with the device-attached memory 130, and may communicate with the device-attached memory 130 based on an independent protocol of the link 150, that is, a device-specific protocol. In addition, as illustrated in FIG. 1, the accelerator circuit 114 may communicate with the host processor 120 via the interface circuit 113 by using the multiple protocols.

The interface circuit 113 may determine one of the multiple protocols based on messages and/or data for communication between the accelerator circuit 114 and the host processor 120. The interface circuit 113 may be connected to at least one protocol queue included in the multi-protocol MUX 112, and transceive messages and/or data to and from the host processor 120 via the at least one protocol queue. In some embodiments, the interface circuit 113 and the multi-protocol MUX 112 may be integrated into one component. In some embodiments, the multi-protocol MUX 112 may include the multiple protocol queues corresponding to each of the multiple protocols supported by the link 150. In addition, in some embodiments, the multi-protocol MUX 112 may arbitrate between communications using different protocols, and provide selected communications to the physical layer 111. In some embodiments, the physical layer 111 may be connected to a physical layer 121 of the host processor 120 via a single interconnection, a bus, a trace, or the like.

The host processor 120 may include a main processor of the system 100, for example, a central processing unit (CPU), and in some embodiments, may correspond to a host processor (or host) of the CXL specification. As illustrated in FIG. 1, the host processor 120 may be connected to the host memory 140, and may include the physical layer 121, a multi-protocol multiplexer (MUX) 122, an interface circuit 123, a coherence/cache circuit 124, a bus circuit 125, at least one core 126, and an input/output (I/O) device 127.

The at least one core 126 may execute an instruction, and may be connected to the coherence/cache circuit 124. The coherence/cache circuit 124 may include a cache hierarchy, and may be referred to as a coherence/cache logic. As illustrated in FIG. 1, the coherence/cache circuit 124 may communicate with the at least one core 126 and the interface circuit 123. For example, the coherence/cache circuit 124 may enable communication by using two or more protocols including the coherent protocol and the memory access protocol. In some embodiments, the coherence/cache circuit 124 may include a direct memory access (DMA) circuit. The I/O device 127 may be used to communicate with the bus circuit 125. For example, the bus circuit 125 may include a PCIe logic, and the I/O device 127 may include a PCIe I/O device.

The interface circuit 123 may enable communication between the components of the host processor 120, for example, between the coherence/cache circuit 124 and the bus circuit 125, and the device 110. In some embodiments, the interface circuit 123 may enable communication of messages and/or data between components of the host processor 120 and the device 110 according to multiple protocols such as an incoherent protocol, the coherent protocol, and the memory protocol. For example, the interface circuit 123 may determine one of the multiple protocols based on messages and/or data for communication between the components of the host processor 120 and the device 110.

The multi-protocol MUX 122 may include at least one protocol queue. The interface circuit 123 may be connected to the at least one protocol queue, and may exchange messages and/or data with the device 110 via the at least one protocol queue. In some embodiments, the interface circuit 123 and the multi-protocol MUX 122 may be integrated into one component. In some embodiments, the multi-protocol MUX 122 may include the multiple protocol queues corresponding to each of the multiple protocols supported by the link 150. In addition, in some embodiments, the multi-protocol MUX 122 may arbitrate between communications using different protocols, and provide selected communications to the physical layer 121.

Figure 2:
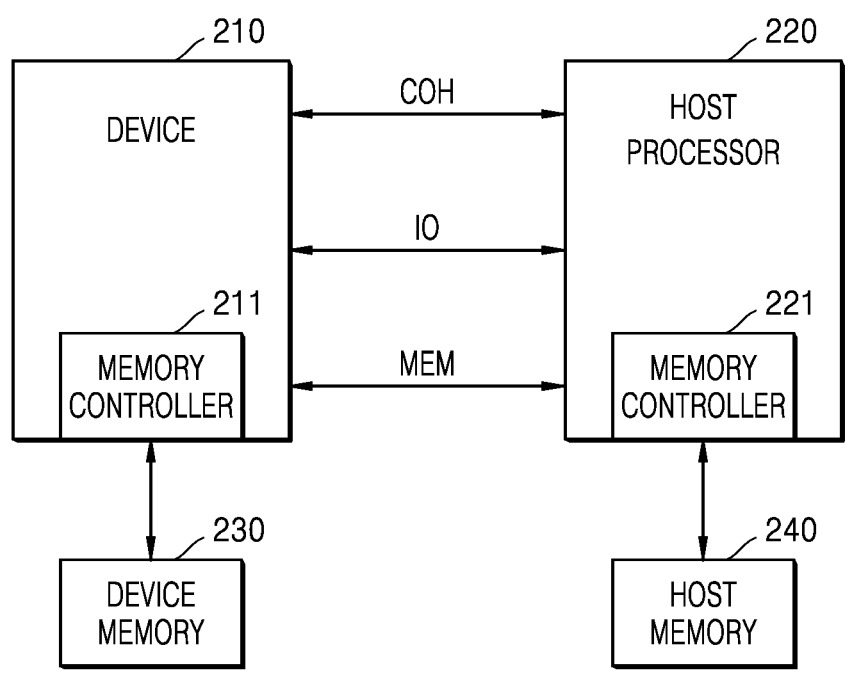
FIG. 2 is a block diagram of a system according to an embodiment.

FIG. 2 is a block diagram of a system 200 according to an embodiment.

Referring to FIG. 2, the system 200 may include a device 210, a host processor 220, a device memory 230, and a host memory 240. In some embodiments, the device memory 230 may correspond to the device-attached memory 130 in FIG. 1.

As described above with reference to FIG. 2, the device 210 and the host processor 220 may communicate with each other based on multiple protocols. The multiple protocols may include a memory protocol MEM, a coherent protocol COH, and an incoherent protocol IO. In some embodiments, referring to the CXL specification 2.0, the memory protocol MEM, the coherent protocol COH, and the incoherent protocol IO may respectively correspond to CXL.mem, CXL.cache, and CXL.io. The incoherent protocol IO may correspond to a PCIe transaction layer, and may be used for operations of device discovery, interrupt management, provision of access to registers, and processing signal errors of the system 200.

The memory protocol MEM may be a protocol that is used when the host processor 220 accesses the memory (for example, the device-attached memory 130 in FIG. 1) of the accelerator (for example, the accelerator circuit 114 in FIG. 1). The memory protocol MEM may define transactions between a master and a subordinate.

The master may be referred to as an agent triggering a request in the CXL.mem protocol. For example, in the case of a transaction for a MemRd command, the master may correspond to the host processor 220 triggering the MemRd command.

The subordinate may be referred to as an agent responsible for responding to a request triggered by the master in the CXL.mem protocol. For example, in the case of a transaction for the MemRd command, the subordinate may correspond to a memory device. The memory device may include the host memory 140 illustrated in FIG. 1, or the device-attached memory 130.

The memory protocol MEM may define a transaction from the master to the subordinate and a transaction from the subordinate to the master. For example, referring to the CXL specification 2.0, a transaction from the master to the subordinate may be referred to as a master to subordinate (M2S) transaction, and a transaction from the subordinate to the master may be referred to as a subordinate to master (S2M) transaction.

According to various embodiments, the device 210 may correspond to any one of at least three types. When the system 200 does not include the host memory 240, the device 210 may correspond to a first type (Type 1) defined in the CXL specification. The multiple protocols in the system 200 including the device 210 of Type 1 may include only the coherent protocol COH and the incoherent protocol IO. When the device 210 corresponds to Type 1, the host processor 220 may use the device 210 to cache data of the host processor 220 into the device memory 230. When the device 210 corresponds to Type 1, the system 200 may a support device to host (D2H) cache coherence and a host to device (H2D) snoop transaction.

When the device 210 operates as an accelerator (for example, when the device 210 includes the accelerator circuit 114 in FIG. 1), the device 210 may correspond to a second type (Type 2) defined in the CXL specification. The multiple protocols in the system 200 including the device 210 of Type 2 may include all of the coherent protocol COH, the incoherent protocol IO, and the memory protocol MEM. For example, the host processor 220 may search for the device 210 by using the incoherent protocol IO, may access the device memory 230 corresponding to the found device 210 by using the memory protocol MEM, and allow the device 210 to use the memory of the host processor 220 by using the coherent protocol COH.

When the device 210 operates as a memory expander, the device 210 may correspond to a third type (Type 3) defined in the CXL specification. The multiple protocols in the system 200 including the device 210 of Type 3 may include the coherent protocol COH and the incoherent protocol IO. For example, the host processor 220 may identify and connect to the device 210 by using the incoherent protocol IO, and access a memory pool of the device 210 by using the memory protocol MEM. The device 210 may communicate with the device memory 230, and may include a memory controller 211 for accessing the device memory 230. In some embodiments, unlike as illustrated in FIG. 2, the memory controller 211 may be outside the device 210, and may be integrated with the device memory 230. In addition, the host processor 220 may communicate with the host memory 240, and may include a memory controller 221 for accessing the host memory 240. In some embodiments, unlike as illustrated in FIG. 2, the memory controller 221 may be outside the host processor 220, and may be integrated with the host memory 240.

According to various embodiments, the device memory 230 may be implemented in various types of memories, and as an example, may be implemented as a storage class memory (SCM).

The SCM may simultaneously have both non-volatile memory characteristics and volatile memory characteristics, and may be accessed in byte units. For example, the SCM may include phase-change random access memory (RAM) (PRAM), ferroelectric RAM (FeRAM), magnetic RAM (MRAM), resistive RAM (RRAM), spin-transfer-torque (STT)-MRAM, or the like.

Figure 3:
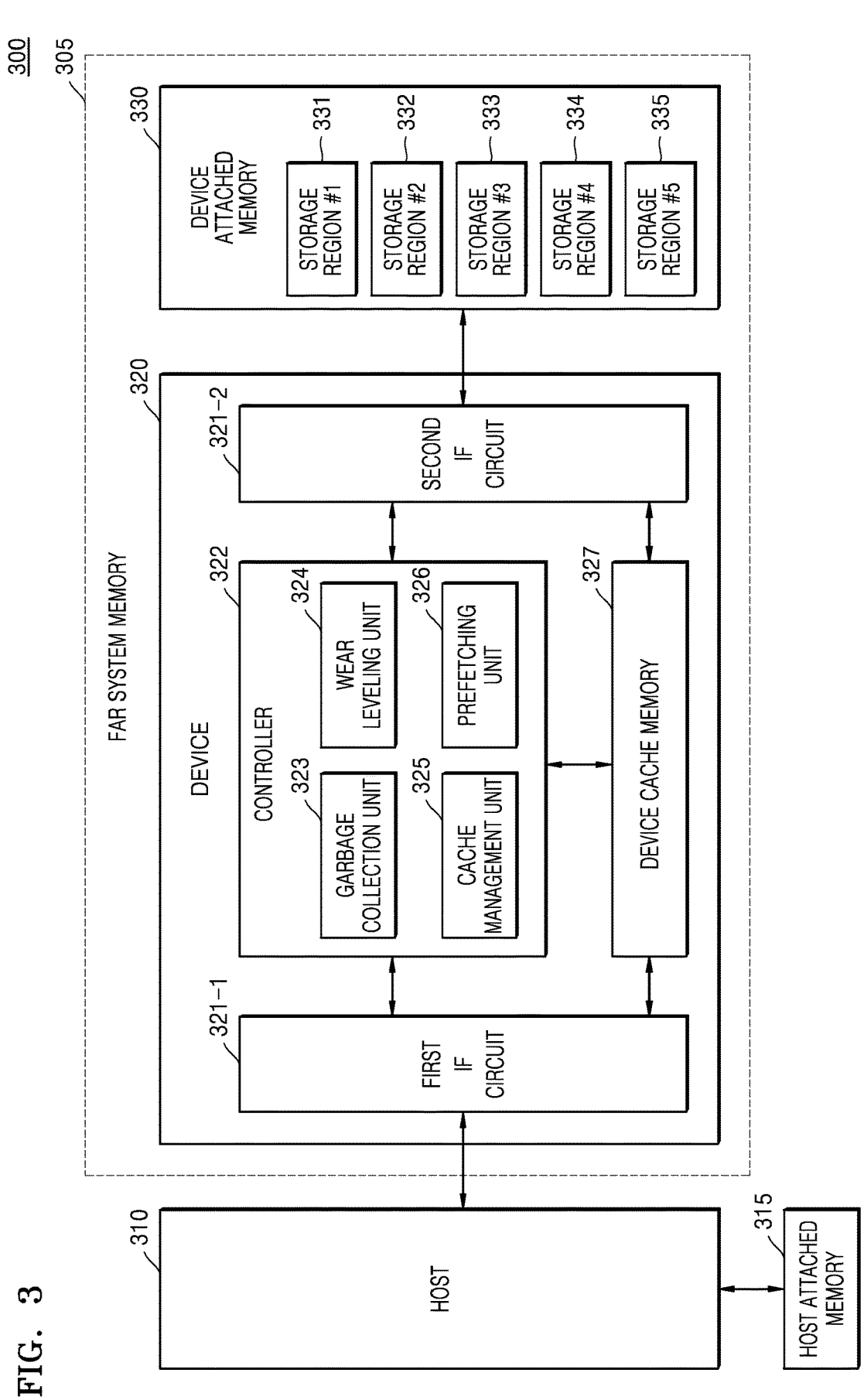
FIG. 3 is a block diagram of a system according to an embodiment.

FIG. 3 is a block diagram of a system 300 according to an embodiment.

Referring to FIG. 3, the system 300 may include a far system memory 305, a host 310, and a host-attached memory 315. The host 310 in FIG. 3 may correspond to the host processor 120 in FIG. 1 and/or the host processor 220 in FIG. 2. Referring to FIG. 3, the far system memory 305 may include a device 320 and a device-attached memory 330. The device 320 in FIG. 3 may correspond to the device 110 in FIG. 1 and/or the device 210 in FIG. 2. The device-attached memory 330 of FIG. 3 may correspond to the device-attached memory 130 in FIG. 1 and/or the device memory 230 in FIG. 2. Duplicate descriptions will be omitted.

The device 320 may support the CXL specification. For example, the device 320 may correspond to Type 3 of the CXL specification. The device 320 may include a first interface (IF) circuit 321-1, a second IF circuit 321-2, a controller 322, and a device cache memory 327. The controller 322 may include at least a garbage collection unit 323, a wear leveling unit 324, a cache management unit 325, and a prefetching unit 326. The controller 322 in FIG. 3 may correspond to the above-described memory controller (211 in FIG. 2).

The garbage collection unit 323 may control the device-attached memory 330 to perform a garbage collection according to the control of the controller 322. For example, when an integrated command INTG CMD is received from the host 310, the controller 322 may determine whether the garbage collection has been performed based on cache management information and/or additional management information included in the integrated command INTG CMD.

The integrated command INTG CMD may be a command defined according to various embodiments of the inventive concept, and may include memory operation information instructing a memory operation (for example, read and write operations) that the host 310 requests from the device-attached memory 330, the cache management information instructing an operation (for example, cache flush and cache keep) on cache lines of the device cache memory 327, and additional management information instructing an operation on at least one storage region of the device-attached memory 330.

The controller 322 may control the garbage collection unit 323 to perform or prevent the garbage collection on at least one storage region (for example, at least one of first storage region 331 through fifth storage region 335) of the device-attached memory 330. For example, when the controller 322 receives the cache management information instructing prefetching of data stored in a particular storage region, the controller 322 may cache the data stored in the particular storage region to the device cache memory 327, and prevent or bypass performing the garbage collection on the particular storage region. As another example, the controller 322 may receive the cache management information that instructs emptying of a cache line in which data of the particular storage region is temporarily stored. The controller 322 may preemptively perform the garbage collection on the particular storage region that has been identified by the additional management information.

In this case, the garbage collection unit 323 may be activated to perform the garbage collection even when the garbage collection unit 323 does not receive an additional separate command instructing performance of the garbage collection in addition to the integration command from the host 310. In other words, the controller 322 may control the device 320 to perform the garbage collection independently of the host 310 even when a command instructing the garbage collection is not received.

The controller 322 may control the wear leveling unit 324 to perform wear leveling on at least one storage region (for example, at least one of first storage region 331 through fifth storage region 335) of the device-attached memory 330.

The first interface circuit 321-1 may communicate with the host 310. In other words, the first interface circuit 321-1 may mediate signal exchange between the host 310 and the device 320. According to an embodiment, the first interface circuit 321-1 may communicate with the host 310 via an accelerator circuit (for example, the accelerator circuit 114 in FIG. 1). The first interface circuit 321-1 may receive an integrated command from the host 310.

The second interface circuit 321-2 may communicate with the device-attached memory 330. According to an embodiment, the second interface circuit 321-2 may transmit a command according to the memory operation information among the integrated commands INTG CMD from the controller 322 to the device-attached memory 330. In addition, the second interface circuit 321-2 may transmit, from the controller 322 to the device-attached memory 330, a control signal for performing the wear leveling and/or garbage collection on at least one storage region of the device-attached memory 330 (for example, at least one of the first storage region 331 through the fifth storage region 335), according to the additional management information among the integrated commands INTG CMD.

Figure 4:
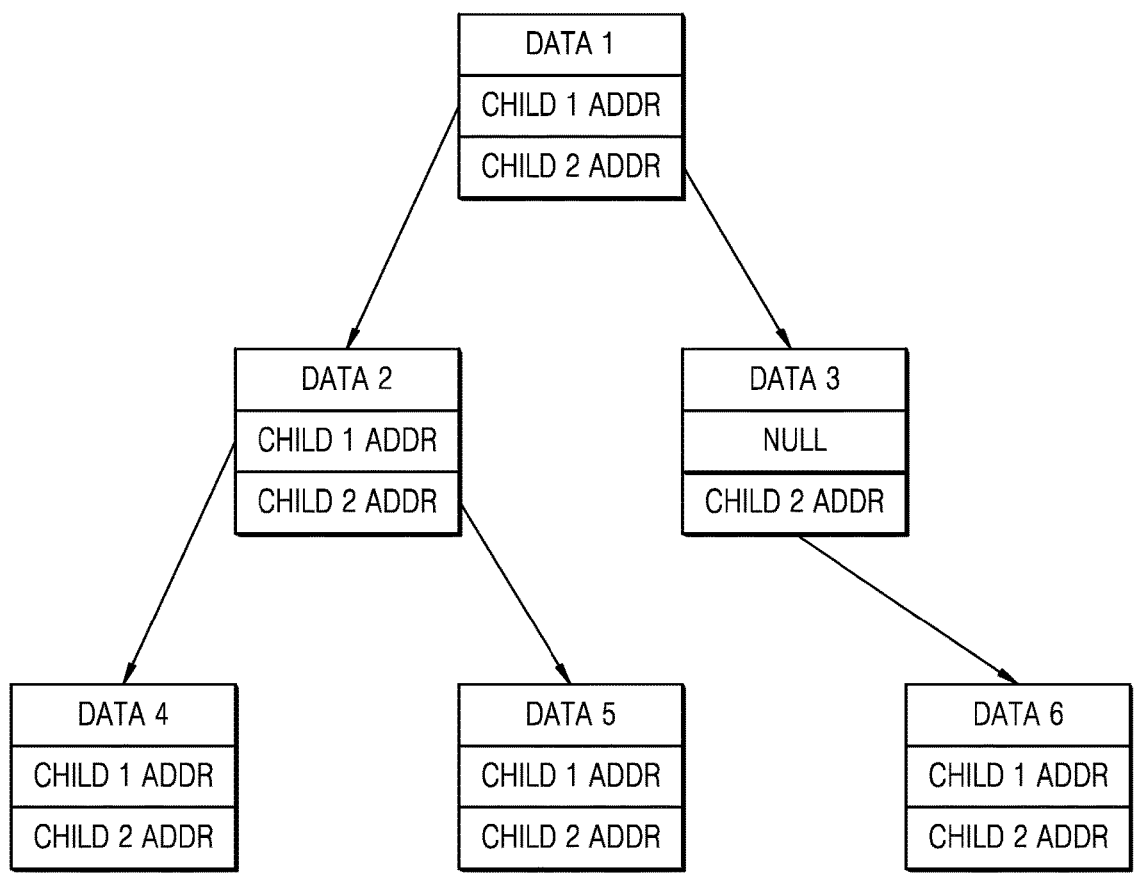
FIG. 4 illustrates a data tree structure according to an embodiment.

FIG. 4 illustrates a data tree structure according to an embodiment.

Referring to FIG. 4, a plurality of pieces of data may have a tree-type data structure. For example, the tree-type may correspond to a type of a binary tree.

According to various embodiments, the data structure may include a plurality of nodes.

A first piece of data DATA 1 may be stored in a root node. The root node may be referred to as a node arranged at the highest level among the plurality of nodes included in the binary tree.

Each of the plurality of nodes may store user data and information about at least one of a first pointer and a second pointer. Each of the first pointer and the second pointer may include address information to be used for instructing child nodes that may be referenced via the root node. For example, referring to FIG. 4, the first pointer may include address information to be used for jumping to a second node including a second piece of data DATA 2, and may include address information to be used for jumping to a third node including a third piece of data DATA 3.

According to various embodiments, any node may have only one child node. For example, the first pointer of the third node may be 'NULL', and the second pointer thereof may include address information to be used for jumping to a sixth node. The third node may have only one child node (for example, the sixth node).

In the above-described embodiment, the data structure is illustrated based on employing a binary tree, but is not limited thereto. According to various embodiments, the data structure may employ at least one of a binary search tree, a ternary tree, and an unbalanced binary tree.

According to various embodiments, referring to FIGS. 3 and 4 together, the host 310 may store information about the binary tree in advance. The host 310 may store in advance information stored by each node and information about the child node instructed by each node. The host 310 may generate and transmit the integrated command INTG CMD to the device 320, based on the previously stored binary tree information. For example, when the third piece of data DATA 3 is expected to be read subsequently to the first piece of data DATA 1, the host 310 may transmit, to the device 320, the memory operation information about requesting a read operation of the first piece of data DATA 1, and the integrated command INTG CMD including the cache management information about requesting prefetching of the third piece of data DATA 3.

Figure 5:
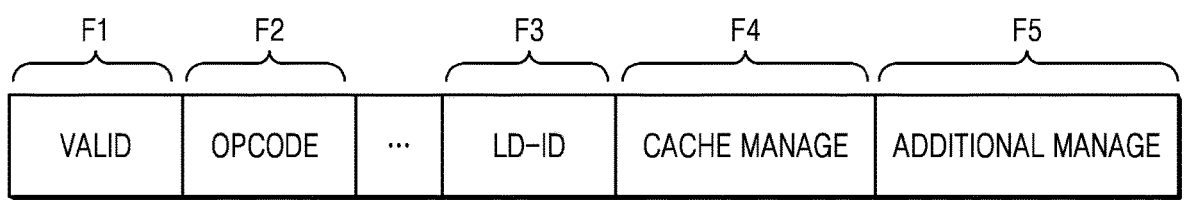
FIG. 5 illustrates fields of an integrated command according to an embodiment.

FIG. 5 illustrates fields of the integrated command INTG CMD according to an embodiment.

Referring to both FIG. 5 and FIGS. 3 and 4, an integrated message 500 may include at least a first field F1 through a fifth field F5. Each of the first through fifth fields F1 through F5 included in the integrated message 500 may include at least one bit, and information corresponding to at least one bit value may be defined by a protocol. The protocol may correspond to the CXL protocol.

The first field F1 may correspond to a valid field. The valid field may include a single bit. When the bit value of the valid field is '1', the integrated command INTG CMD may be identified as valid at a receiving side (for example, the receiving side is the subordinate in the case of the M2S request, and is the device in the case of the H2D request).

The second field F2 may, as an operation code, include a plurality of bits defining a memory operation. Referring to the CXL specification, the second field F2 may correspond to a 'MemOpcode' field. The second field F2 may include four bits instructing the memory operation. For example, in the case of a general memory data read (MemRdData) operation, the second field F2 may include '0001'.

The third field F3 may, as an identifier of a logical device LD, be included in the device 210 when the device 210 is implemented as a multi-logical device (MLD). The third field F3 may include four bits, and the four bits may instruct any one logical device LD among logical devices LD.

The fourth field F4 may, as a cache management field, include the cache management information about the device cache memory 327 after the memory operation corresponding to the second field F2 is performed. The cache management information may include information for controlling the device cache memory 327 in relation to the memory operation corresponding to the second field F2. The cache management information may refer to any information for changing data to be stored in the device cache memory 327 to increase the possibility of a cache hit and prevent a cache miss. For example, the cache management information may include at least one of information instructing cache flush, cache keep, and prefetching.

The fifth field F5 may, as an additional management field, include information about the device-attached memory 330 after the device cache memory 327 corresponding to the fourth field F4 is controlled. The additional management field may include information instructing an operation for an efficient use of the device-attached memory 330. For example, the additional management field may include information instructing the garbage collection and/or wear leveling on the device-attached memory 330. The device 210 may control the controller 322 based on the additional management information of the fifth field F5. For example, when the cache management information instructs the cache flush, the device 210 may control the device-attached memory 330 to perform the garbage collection on a storage region storing data corresponding to the cache flush.

Figure 6A:
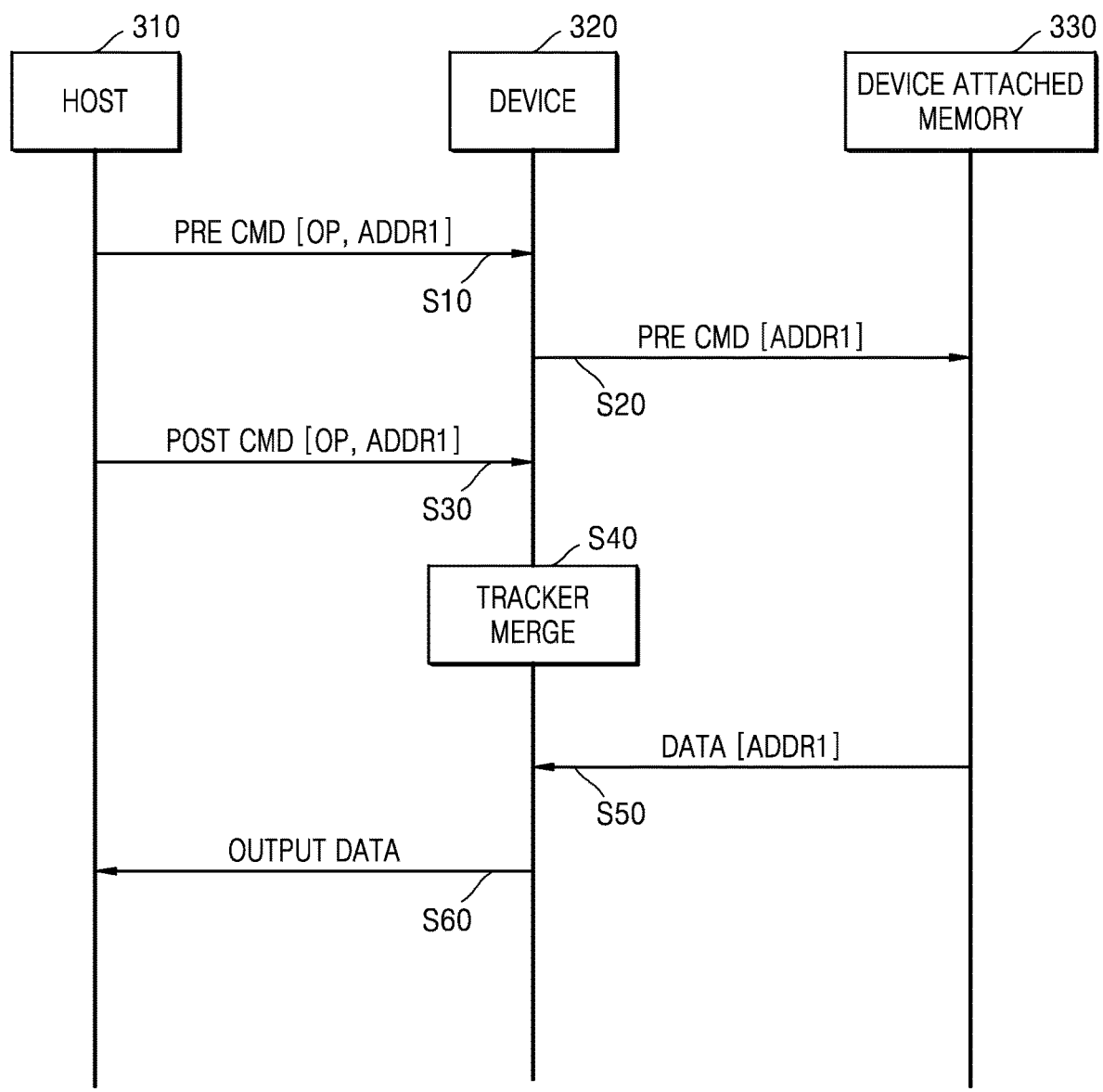
FIG. 6A is a signal exchange diagram according to a comparative example.

FIG. 6A is a signal exchange diagram according to a comparative example.

Referring to FIG. 6A, the host 310 may transmit a pre-command PRE CMD to the device 320 (S10). The pre-command PRE CMD may, as a command for reducing latency, include a command for allowing the host 310 to access a memory of the device-attached memory 330 before the cache coherence is resolved. Referring to the CXL specification 2.0, the pre-command PRE CMD may correspond to a MemSpecRd command.

According to various embodiments, the device 320 may not transmit a completion message in response to receiving the pre-command PRE CMD, and may arbitrarily drop the pre-command PRE CMD according to the condition of the cache line. For example, when another memory access is in progress for the same cache line address, the device 320 may drop the received pre-command PRE CMD. To prevent performance degradation of the far system memory 305, the pre-command PRE CMD may have a lower priority compared to other commands. Referring to FIG. 6A, the pre-command PRE CMD may have an operation code of the MemSpecRd and a meta value of a first address ADDR1.

The device 320 may transmit the pre-command PRE CMD to the device-attached memory 330 (S20). For example, when the pre-command PRE CMD includes an operation code of the MemSpecRd, the device 320 may transmit the MemRd command to the device-attached memory 330. Because the pre-command PRE CMD is a command for allowing a memory access even before cache coherence is resolved, the device 320 may transmit the MemRd command to the device-attached memory 330 regardless of whether the cache coherency has been resolved. The device-attached memory 330 may allow access to the first address ADDR1 in response to receiving the pre-command PRE CMD. The cache coherence may not be resolved yet at the time point of operation S20.

The host 310 may transmit a post-command POST CMD to the device 320 (S30). According to various embodiments, when the pre-command PRE CMD is the MemSpecRd command, the post-command POST CMD may correspond to the MemRd command. As another example, when the pre-command PRE CMD is a MemSpecWr command, the post-command POST CMD may correspond to a MemWr command.

The device 320 may perform command merging (S40). Referring to the CXL specification 2.0, the command merging may correspond to a tracker merging. The command merging may be a process of merging address information, that is, the first address ADDR1, to which memory access is allowed before the cache coherence is resolved by the pre-command PRE CMD, and post-command information to be executed by the device 320 with respect to the address information. According to various embodiments, the device 320 may perform the command merging by comparing whether the address information about the pre-command PRE CMD is the same as the address information about the post-command POST CMD. For example, when these two pieces of address information do not match with each other, the device 320 may drop a packet for read data that is output from the device-attached memory 330.

The device-attached memory 330 may transmit read data corresponding to the first address ADDR1 to the device 320, and the device 320 may output the read data to the host 310 (S50 and S60). The device 320 may be controlled to transmit the read data to the host 310 only when the address information about the pre-command PRE CMD and the address information about the post-command POST CMD match with each other by using the command merging in operation S40.

Referring to the above-described embodiment, the host 310 may enable the memory access before the cache coherence is resolved by transmitting the pre-command PRE CMD to the device 320, and may reduce latency by subsequently transmitting the post-command POST CMD to the device 320. However, when a low priority of the pre-command PRE CMD is considered, because the pre-command PRE CMD has somewhat high possibility of being dropped at the side of the device 320, and at least two kinds of signaling (the pre-command PRE CMD and the post-command POST CMD) are required for one memory operation, management overhead of the far system memory 305 may be increased.

Figure 6B:
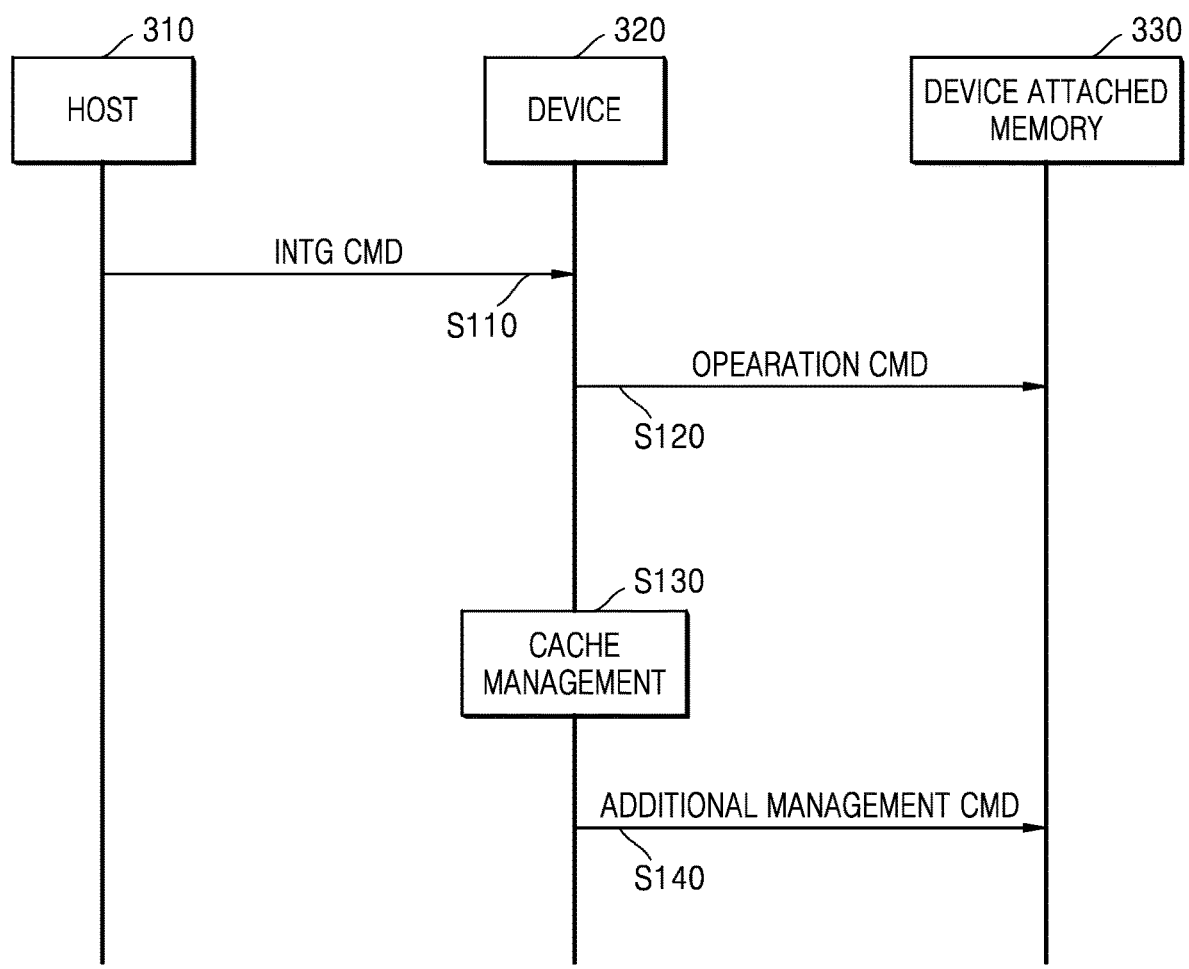
FIG. 6B is a signal exchange diagram according to an embodiment.

FIG. 6B is a signal exchange diagram according to an embodiment.

Referring to FIG. 6B, the host 310 may transmit the integrated command INTG CMD to the device 320 (S110). The integrated command INTG CMD may include the memory operation information, the cache management information, and the additional management information.

The memory operation information may include information about a memory operation and an address requested by the host 310 to the device 320. For example, referring to FIGS. 4 and 6B together, when the host 310 requests reading the first piece of data 1, the operation information may include an operation code of the MemRD and information about the first address ADDR1 in which the first piece of data DATA 1 is stored.

The cache management information may include information about management performed on the device cache memory 327 by the device 320, and a cache line address. For example, the management information may include information instructing performance of at least one of the cache keep, cache flush, and prefetching on at least one cache line among the plurality of cache lines. The cache line address information may instruct a cache line that is an object of the cache keep, the cache flush, or the prefetching. The host 310 may increase a cache hit and reduce read latency by including the cache management information in one integrated command INTG CMD in addition to the memory operation information, and transmitting the integrated command INTG CMD.

For example, when a fourth piece of data DATA 4 is expected to be read after the first piece of data DATA 1 in sequence, the host 310 may transmit, to the device 320, the integrated command INTG CMD including the memory operation information about requesting a read of the first piece of data DATA 1 and the cache management information about requesting prefetching of the fourth piece of data DATA 4. The device 320 may read the first piece of data DATA 1 based on the received integrated command INTG CMD, output the read data to the host 310, and prefetch the fourth piece of data DATA 4 to be stored in the device cache memory 327. Thereafter, when the host 310 requests to read the fourth piece of data DATA 4, because the fourth piece of data DATA 4 has already been stored in the device cache memory 327, the device 320 may determine the cache hit, and may output the fourth piece of data DATA 4 to the host 310 based on a low latency.

The additional management information may include information instructing an additional operation on the device-attached memory 330. For example, the additional management information may include at least information instructing the garbage collection on a particular memory region of the device-attached memory 330 and/or information about wear leveling on the device-attached memory 330.

The device 320 may transmit an operation command OPERATION CMD to the device-attached memory 330 (S120). The device 320 may obtain the memory operation information by decoding the integrated command INTG CMD received from the host 310. The memory operation information may include command information about a memory operation to be performed on the device-attached memory 330. For example, the integrated command INTG CMD may include the memory operation information instructing a memory read request for the first address ADDR1. In this case, the device 320 may transmit a read command to the device-attached memory 330 based on the memory operation information. For example, the read command may include an operation code of MemRd, and an address value of the first address ADDR 1 as a meta value.

The device 320 may perform cache management (S130). The device 320 may obtain the cache management information by decoding the integrated command INTG CMD received from the host 310. The cache management information may include command information instructing a cache operation to be performed on the device cache memory 327 included in the device 320. For example, when the cache management information instructs the cache flush on the first piece of data DATA 1, the device 320 may perform the cache flush by first overwriting a cache line in which the first piece of data DATA 1 is stored among a plurality of cache lines of the device cache memory 327.

The device 320 may transmit an additional management command ADDITIONAL MANAGEMENT CMD to the device-attached memory 330 (S140). The additional management command ADDITIONAL MANAGEMENT CMD may include a command generated based on the additional management information included in the integrated command INTG CMD. The device 320 may transmit an additional management command ADDITIONAL MANAGEMENT CMD instructing the garbage collection and/or wear leveling according to the additional management information that may be obtained by decoding the integrated command INTG CMD.

In the above-described embodiment, the additional management information has been described as being included in the integrated command INTG CMD, but is not limited thereto. According to various embodiments, the device 320 may store in advance a table of the additional management information to be mapped to the cache management information. When the cache management information is included in the integrated command INTG CMD, the device 320 may refer to the table, for decoding the cache management information and identifying the additional management information corresponding to the decoded cache management information. For example, when the cache management information corresponds to the cache flush on the third piece of data DATA 3, the additional management information mapped in advance in response to the cache flush may include information instructing performance of the garbage collection on the memory region in which the target data for the cache flush is stored.

Figure 7:
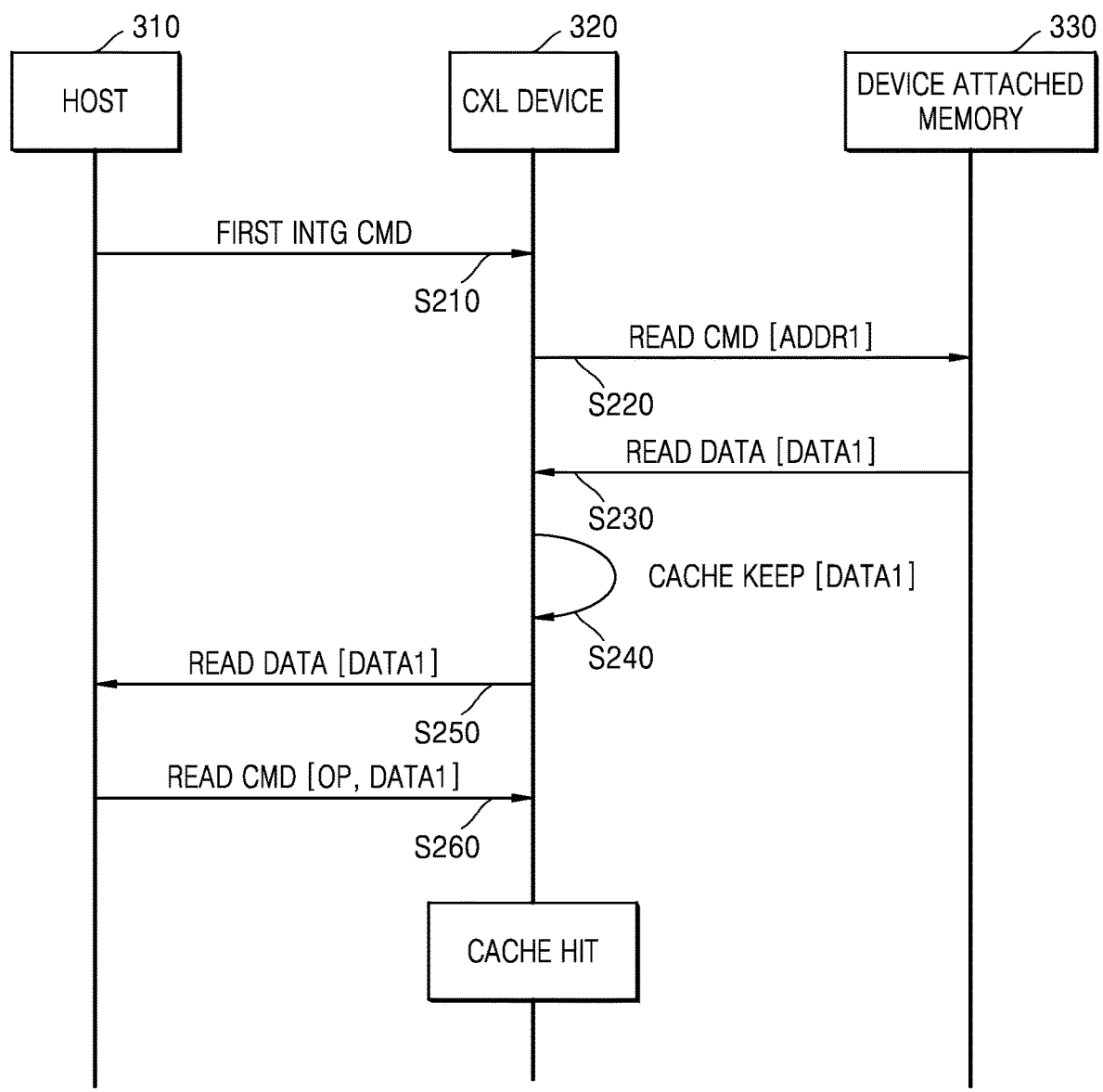
FIG. 7 is a signal exchange diagram of performing cache maintenance, according to an embodiment.

FIG. 7 is a signal exchange diagram of performing the cache keep, according to an embodiment.

Referring to FIG. 7, the host 310 may transmit the first integrated command FIRST INTG CMD to the device 320 (S210). The host 310 may request to read the first piece of data DATA 1, and at the same time, considering that the frequency of calling the first piece of data DATA 1 is high, may request to maintain the first piece of data DATA 1 in the device cache memory 327.

The first integrated command FIRST INTG CMD may include first memory operation information and first cache management information. The first memory operation information may include a MemRd operation code requesting a read of the first piece of data DATA 1, and information about the first address ADDR1 instructing a storage region of the first piece of data DATA 1. The first cache management information may include an operation code instructing the cache keep, and cache data information indicating the first piece of data DATA 1 that is target data for the cache keep.

The device 320 may decode the received first integrated command FIRST INTG CMD, and transmit a read command READ CMD to the device-attached memory 330 based on the decoded first integrated command FIRST INTG CMD (S220). The controller 322 of the device 320 may request to read the first piece of data DATA 1 stored in a first address ADDR1 based on the first integrated command FIRST INTG CMD. The device 320 may receive read data from the device-attached memory 330 (S230). The read data may be the first piece of data DATA 1 stored at the first address ADDR1.

The device 320 may perform the cache keep on the first piece of data DATA 1 (S240). For example, when the read first piece of data DATA 1 is stored in a third cache line among the plurality of cache lines of the device cache memory 327, the device 320 may prevent overwriting on the third cache line in which the first piece of data DATA 1 has been stored. When data from the device-attached memory 330 is received and cached, the device 320 may control the device cache memory 327 to preferentially overwrite on the remaining cache lines except for the third cache line.

The device 320 may output the read data READ DATA to the host 310 (S250). The read data READ DATA may be the first piece of data DATA 1 requested by the first integrated command FIRST INTG CMD.

In the above-described embodiment, it is illustrated that the cache keep in S240 precedes the operation of outputting the read data READ DATA in S250, but the embodiment is not limited thereto. According to various embodiments, the device 320 may first output the read data to the host 310, and then perform the cache keep on a cache line in which the output read data READ DATA is temporarily stored.

The device 320 may receive a request to read the first piece of data DATA 1 from the host 310 (S260). The device 320 may receive a read command READ CMD of the first piece of data DATA 1 from the host 310, and may preemptively search the device cache memory 327. The device 320 may search the device cache memory 327, and when the first piece of data DATA 1 is not stored in the device cache memory 327, may determine that there is a cache miss, and request the device-attached memory 330 to read the first piece of data DATA 1. In this case, according to the above-described embodiment, the device 320 may maintain the cache line in which the first piece of data DATA 1 is stored based on the cache management information. Accordingly, the first piece of data DATA 1 may still be stored in the device cache memory 327. The device 320 may identify that the first piece of data DATA 1 is in the device cache memory 327, and immediately output the first piece of data DATA 1 to the host 310. In other words, the host 310 may reduce the read latency of the first piece of data DATA 1, by using the first integrated command FIRST INTG CMD, by instructing not only reading the first piece of data DATA 1 but also maintaining the cache keep of the first piece of data DATA 1.

Figure 8:
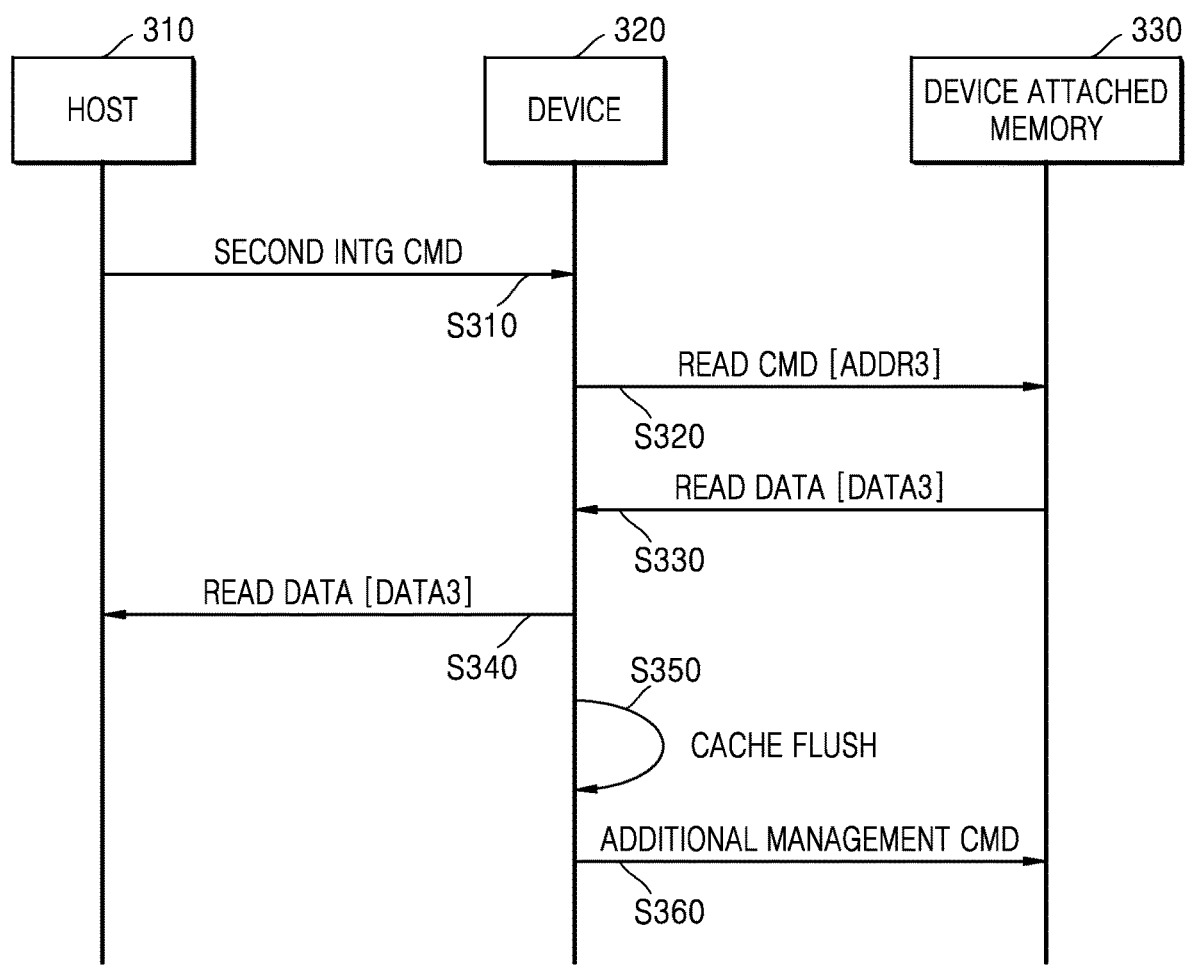
FIG. 8 is a signal exchange diagram of performing cache emptying and garbage collection, according to an embodiment.

FIG. 8 is a signal exchange diagram for performing the cache flush and garbage collection, according to an embodiment.

Referring to FIG. 8, the host 310 may transmit a second integrated command SECOND INTG CMD to the device 320 (S310). The host 310 may request to read a third piece of data DATA 3, and request the cache flush for the third piece of data DATA 3. In other words, the host 310 may determine that the third piece of data DATA 3 will no longer be needed after the third piece of data DATA 3 is read, and generate the second integrated command SECOND INTG CMD.

The second integrated command SECOND INTG CMD may include second memory operation information, second cache management information, and second additional management information. The second memory operation information may include the MemRd operation code for requesting a read of the third piece of data DATA 3, and third address information indicating a storage region of the third piece of data DATA 3. Second cache management information may include a cache flush operation code instructing the cache flush, and cache data information indicating the third piece of data DATA 3 that is a target data of the cache flush. Second additional management information may include information instructing the garbage collection of a storage region in which the third piece of data DATA 3 is stored.

The device 320 may transmit the read command READ CMD to the device-attached memory 330 (S320). The device 320 may decode the received second integrated command SECOND INTG CMD, and transmit, to the device-attached memory 330, the read command READ CMD instructing to read a third address ADDR3 based on the second memory operation information in the second integrated command SECOND INTG CMD. The device 320 may receive read data READ DATA from the device-attached memory 330 (S330). The read data READ DATA may be the third piece of data DATA 3 stored in the third address ADDR3. The device 320 may output the read third piece of data DATA 3 to the host 310 (S340).

The device 320 may perform the cache flush on the third piece of data DATA 3 (S350). For example, the read third piece of data DATA 3 may be stored in the first cache line among the plurality of cache lines of the device cache memory 327. The device 320 may, to perform the cache flush, clear the first cache line in response to outputting the third piece of data DATA 3 to the host 310. Alternatively, the device 320 may set a higher priority of overwriting for the first cache line. Accordingly, data to be cached in the next turn may be preferentially overwritten on the first cache line.

The device 320 may instruct the device-attached memory 330 to perform the garbage collection on the third piece of data DATA 3 (S360). According to an embodiment, the device 320 may instruct the garbage collection according to the second additional management information obtained by decoding the second integrated command SECOND INTG CMD. According to another embodiment, the device 320 may store an additional management table in advance. The additional management table may store, in advance, additional management information mapped to the cache management information. For example, when the cache management information is for the cache flush, the mapped additional management information may include information instructing the garbage collection. The device 320 may control the device-attached memory 330 to perform the garbage collection on the third address ADDR3 that is a region storing the third piece of data DATA 3, based on the second additional management information or the additional management table.

Figure 9:
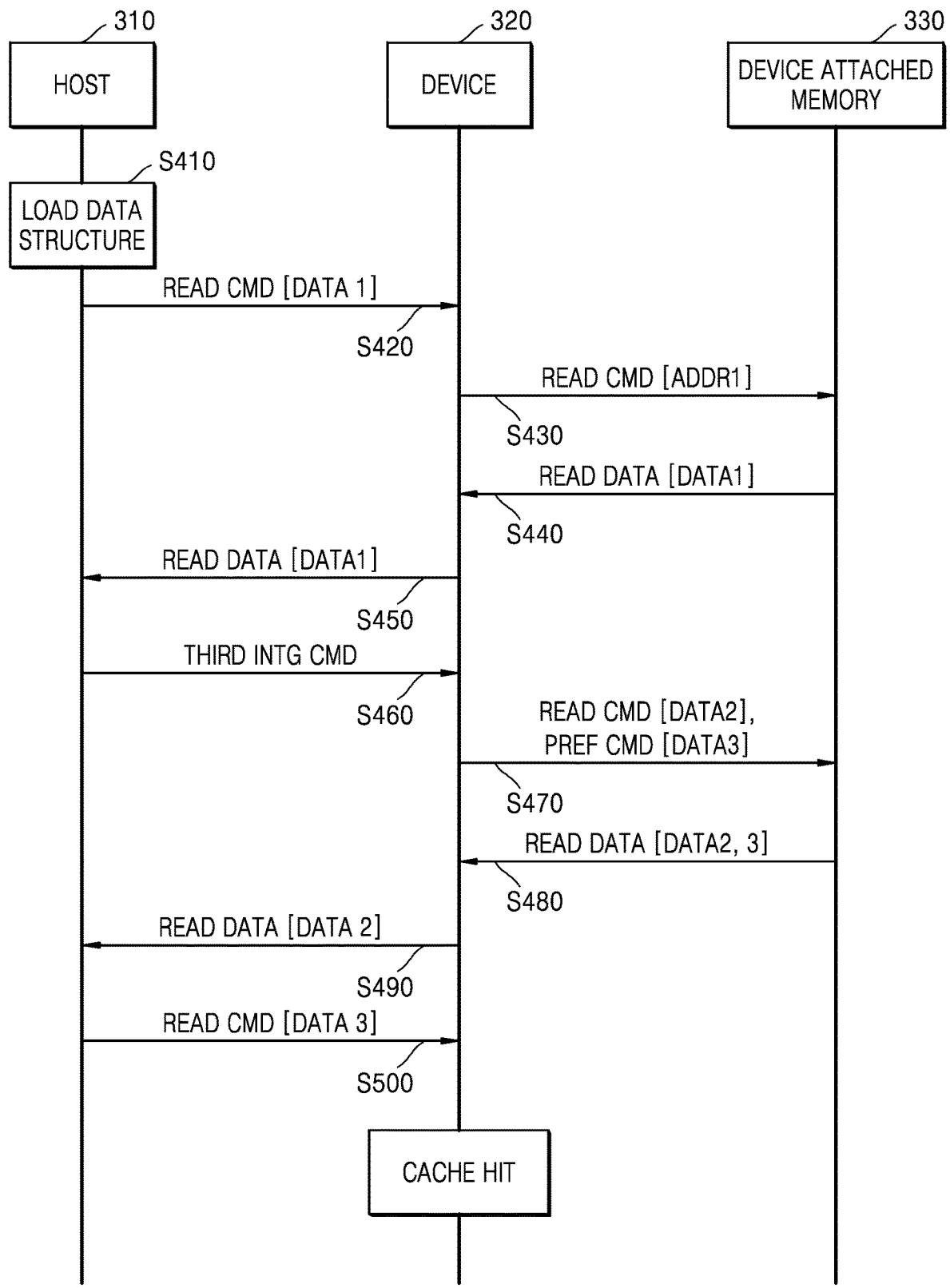
FIG. 9 is an example of a signal exchange diagram of performing prefetching, according to an embodiment.

FIG. 9 is an example of a signal exchange diagram of performing prefetching, according to an embodiment.

Referring to FIG. 9, the host 310 may load pre-stored binary tree information (S410). The host 310 may, based on the binary tree information, identify a relationship forming a child node between the plurality of nodes, and based on the identified relationship, may determine data to be prefetched.

The host 310 may transmit the read command READ CMD for the first piece of data DATA 1 to the device 320 (S420). The device 320 may receive the read command READ CMD for the first piece of data DATA 1, and search the device cache memory 327. The device 320 may identify that the first piece of data DATA 1 has not been cached, and transmit the read command READ CMD for the first address ADDR1 to the device-attached memory 330 (S430). The device-attached memory 330 may output the first piece of data DATA 1 stored in the first address ADDR1 to the device 320, in response to receiving the read command READ CMD for the first address ADDR1 (S440). The device 320 may output the read data READ DATA to the host 310 (S450). The read data READ DATA may correspond to the first piece of data DATA 1 instructed by the read command READ CMD.

The host 310 may transmit a third integrated command THIRD INTG CMD to the device 320 (S460). The host 310 may, after reading the first piece of data DATA 1, identify in advance that the second piece of data DATA 2 and the third piece of data DATA 3 are to be called. Calling of the third piece of data DATA 3 may follow calling of the second piece of data DATA 2.

The third integrated command THIRD INTG CMD may include third memory operation information and third cache management information. The third memory operation information may include a MemRd operation code requesting a read of the second piece of data DATA 2, and information about a second address ADDR2 indicating a storage region of the second piece of data DATA 2. The third cache management information may include an operation code instructing prefetching, and cache data information indicating the third piece of data DATA 3 that is target data of the prefetching.

The device 320 may transmit, to the device-attached memory 330, the read command READ CMD for the second piece of data DATA 2 and a prefetching command PREF CMD for the third piece of data DATA 3 (S470). Referring to FIG. 9, although it is illustrated that the read command READ CMD for the second piece of data DATA 2 is simultaneously transmitted with the prefetching command PREF CMD for the third piece of data DATA 3, the embodiment is not limited thereto. The read command READ CMD for the second piece of data DATA 2 that is to be preemptively called may be transmitted first, and the prefetching command PREF CMD for the third piece of data DATA 3 for being temporarily stored in the device cache memory 327 may be transmitted later.

The device-attached memory 330 may output the second piece of data DATA 2 and the third piece of data DATA 3 to the device 320 (S480). According to various embodiments, the device-attached memory 330 may sequentially read data based on priority among commands. The device-attached memory 330 may compare the priority of the read command READ CMD to the priority of the prefetching command PREF CMD. The device-attached memory 330 may first execute the read command READ CMD of a high priority. The device-attached memory 330 may first output the second piece of data DATA 2 corresponding to the read command READ CMD to the device 320, and then output the third piece of data DATA 3 corresponding to the prefetching command PREF CMD later.

The device 320 may output the second piece of data DATA 2 as the read data to the host 310 (S490). The device 320 may output the second piece of data DATA 2, and cache the third piece of data DATA 3 in the device cache memory 327, in response to the read command READ CMD for the second piece of data DATA 2.

The host 310 may transmit the read command READ CMD for the third piece of data DATA 3 to the device 320 (S500). The device 320 may preemptively search the device cache memory 327 based on the transmitted read command READ CMD. Because the device cache memory 327 has been caching the third piece of data DATA 3, the device 320 may determine the cache hit. Thereafter, the device 320 may output the third piece of data DATA 3 stored in the device cache memory 327 to the host 310. Accordingly, the host 310 may perform data reading with low latency by instructing prefetching on data that is expected to be called.

In the above-described embodiments, to avoid channel contention between the second piece of data DATA 2 and the third piece of data DATA 3, the device 320 is illustrated as transmitting each of the commands of different priorities to the device-attached memory 330, but the embodiment is not limited thereto. According to various embodiments, the device 320 may transmit a command instructing prefetching of the second piece of data DATA 2 and the third piece of data DATA 3 before transmitting the read command READ CMD for the second piece of data DATA 2. In this case, the host 310 may transmit the command by further including an additional bit indicating one of the second piece of data DATA 2 and the third piece of data DATA 3. In this case, when the additional bit is 1, the device 320 may prefetch the second piece of data DATA 2 first, and when the additional bit is 0, the device 320 may prefetch the third piece of data DATA 3 first. In other words, the host 310 may prevent channel contention by transmitting a prefetching command including an additional bit, or by transmitting a read command together with a prefetching command.

Figure 10:
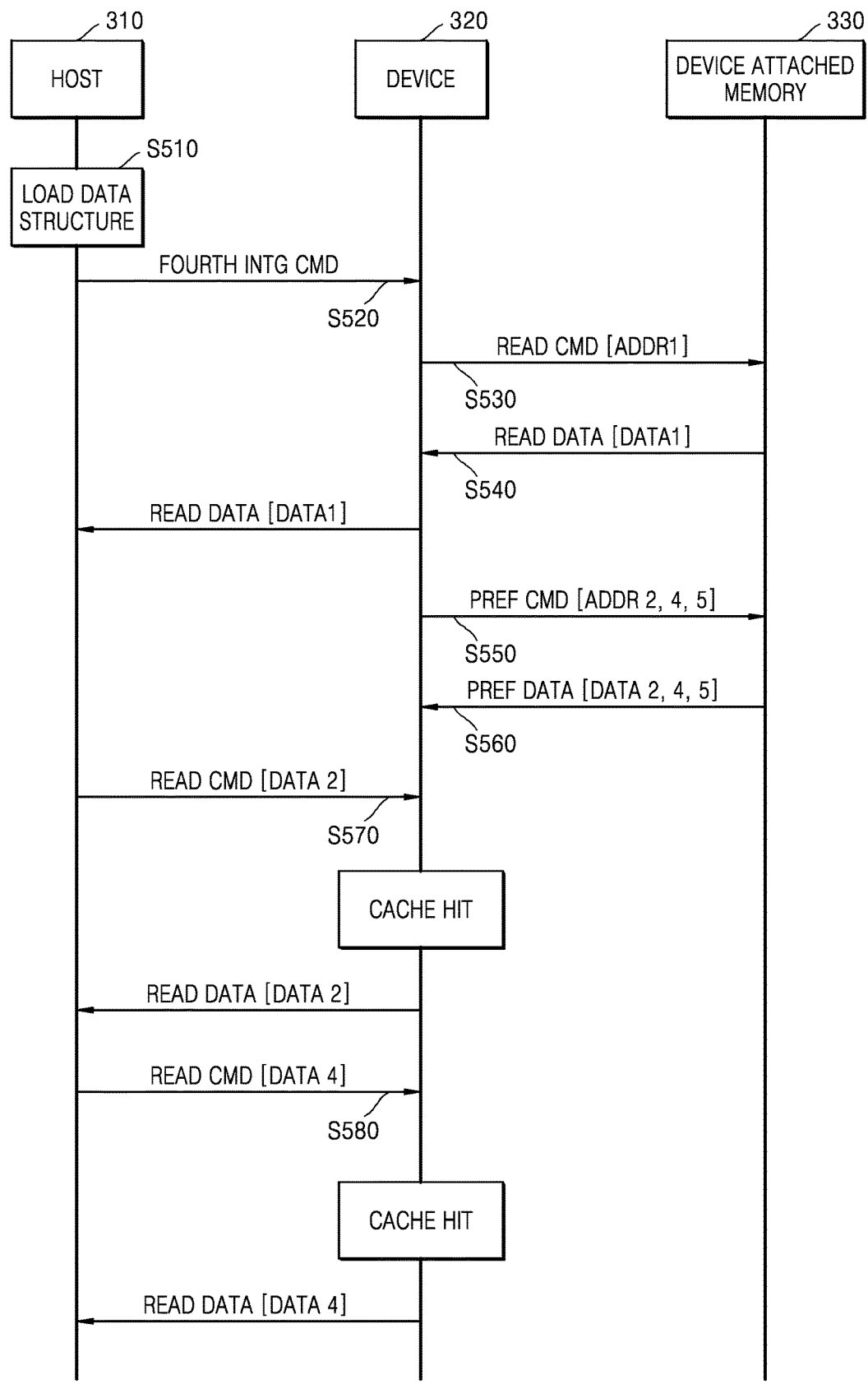
FIG. 10 is another example of a signal exchange diagram of performing prefetching, according to an embodiment.

FIG. 10 is another example of a signal exchange diagram of performing the prefetching, according to an embodiment.

Referring to FIG. 10, the host 310 may load pre-stored binary tree information (S510). Operation S510 may correspond to operation S410 in FIG. 9.

The host 310 may transmit a fourth integrated command FOURTH INTG CMD to the device 320 (S520). The device 320 may request to read the first piece of data DATA 1 of the root node based on the binary tree structure loaded in operation S510, and at the same time, may request to prefetch a plurality of pieces of data for lower nodes in advance.

The fourth integrated command FOURTH INTG CMD may include fourth memory operation information and fourth cache management information. The fourth memory operation information may include a MemRd operation code requesting a read of the first piece of data DATA 1, and information about the first address ADDR1 indicating a storage region of the first piece of data DATA 1. The fourth cache management information may include an operation code for requesting prefetching, and number information indicating the number of lower nodes to be prefetched in advance.

The host 310 may identify information about the lower nodes of the first piece of data DATA 1 based on the binary tree structure loaded in operation S510. For example, referring to FIG. 4 also, the host 310 may identify the lower nodes of the root node of the first piece of data DATA 1 (for example, the second node, a fourth node, and a fifth node) to be prefetched based on the binary tree structure. The host 310 may determine the number of lower nodes to be prefetched in advance, based on the usage status (or usage pattern) of the plurality of cache lines, statistics of data to be requested later in the currently running application, etc. For example, the host 310 may further include, in the fourth integrated command FOURTH INTG CMD, additional bits indicating three pieces of information, in addition to the read command READ CMD for the first piece of data DATA 1. Additionally, the host 310 (or a host processor) may generate the cache management information based on at least one of a type of an application that is currently running, a statistic of an input and/or output of data in the application, and a usage pattern of the application.

According to various embodiments, the cache management information of the fourth integrated command FOURTH INTG CMD may include information indicating a prefetching order in addition to the number information. For example, the host 310 may request to sequentially prefetch the lower nodes, or may explicitly indicate an order of prefetching the number of nodes.

The device 320 may transmit the read command READ CMD for the first address to the device-attached memory 330 (S530). The device 320 may decode the fourth integrated command FOURTH INTG CMD, and instruct to read the first piece of data DATA 1 based on the fourth memory operation information. Thereafter, the device-attached memory 330 may output the first piece of data DATA 1 stored in the first address ADDR1 to the device 320, in response to the read command READ CMD received in operation S530 (S540).

The device 320 may transmit the prefetching command PREF CMD instructing prefetching the plurality of nodes to the device-attached memory 330 (S550). The device 320 may determine how many lower nodes are to be prefetched in a certain order, based on the fourth cache management information included in the fourth integrated command FOURTH INTG CMD. For example, when the host 310 requests to sequentially prefetch three lower nodes for the first piece of data DATA 1, the device 320 may sequentially transmit three prefetching commands PREF CMD to the device-attached memory 330. The sequentially transmitted prefetching commands PREF CMD may indicate the second address ADDR2, a fourth address ADDR4, and a fifth address ADDR5, respectively.

The device-attached memory 330 may output data corresponding to the prefetching command PREF CMD to the device 320 (S560). The device-attached memory 330 may output data according to the order in which the prefetching commands PREF CMD are received from the device 320. For example, when the prefetching commands PREF CMD respectively indicating the second address ADDR2, the fourth address ADDR4, and the fifth address ADDR5 are sequentially received, the device-attached memory 330 may sequentially output the second piece of data DATA 2, the fourth piece of data DATA 4, and the fifth piece of data DATA 5 to the device 320. The device 320 may sequentially cache the received data in the device cache memory 327.

The host 310 may transmit a command to request a read of the second piece of data DATA 2 to the device 320 (S570). Because the second data has been cached in the device cache memory 327 in advance by the fourth integrated command FOURTH INTG CMD, the device 320 may determine the cache hit based on the read command READ CMD. The device 320 may directly output the second piece of data DATA 2 stored in the device cache memory 327 to the host 310.

The host 310 may transmit a command to request a read of the fourth piece of data DATA 4 to the device 320 (S580). Because the fourth piece of data DATA 4 has been cached in the device cache memory 327 in advance by the fourth integrated command FOURTH INTG CMD, the device 320 may determine the cache hit based on the read command READ CMD. The device 320 may directly output the fourth piece of data DATA 4 stored in the device cache memory 327 to the host 310.

Figure 11:
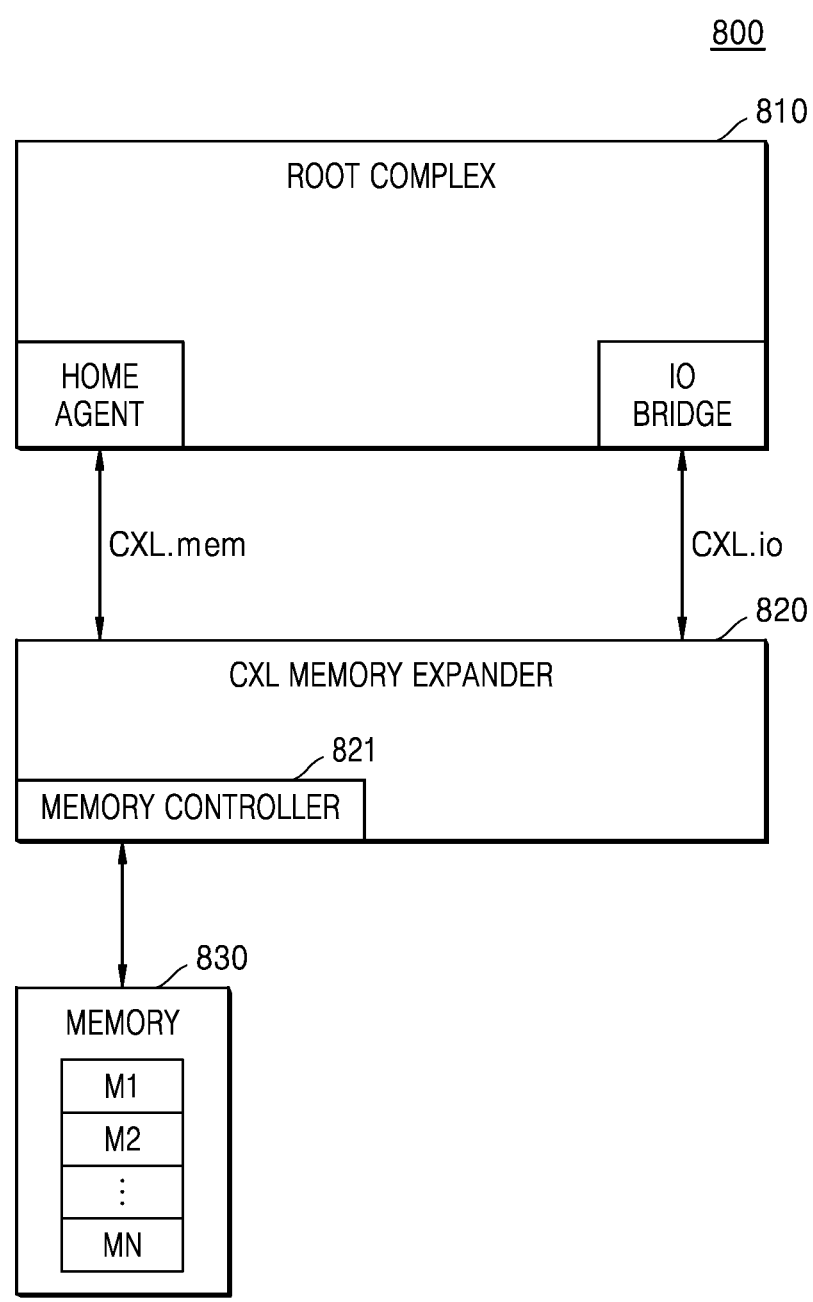
FIG. 11 is a block diagram of a system according to an embodiment.

FIG. 11 is a block diagram of a system according to an embodiment.

Referring to FIG. 11, a system 800 may include a root complex 810, a CXL memory expander 820 connected thereto, and a memory 830. The root complex 810 may include a home agent and an I/O bridge, and the home agent may communicate with the CXL memory expander 820 based on a coherent protocol CXL.mem, and the I/O bridge may communicate with CXL memory expander 820 based on an incoherent protocol CSL.io. In a CXL protocol base, the home agent may correspond to an agent on a host side that is arranged to solve the entire consistency of the system 800 for a given address.

The CXL memory expander 820 may include a memory controller 821, and the memory controller 821 may perform operations of the memory controllers (e.g., 211 in FIG. 2, 322 in FIG. 3).

In addition, according to the embodiment, the CXL memory expander 820 may output data to the root complex 810 via the I/O bridge based on the incoherent protocol CXL.io or the PCIe.

The memory 830 may include first through $n^{th}$ memory regions M1 through Mn, and each of the first through $n^{th}$ memory regions M1 through Mn may be implemented as a memory of various units. As an example, when the memory 830 includes multiple volatile or non-volatile memory chips, a unit of each of the first through $n^{th}$ memory regions M1 through Mn may be a memory chip. Alternatively, the unit of each of the first through $n^{th}$ memory regions M1 through Mn may be implemented to correspond to various sizes defined in a memory such as a semiconductor die, a block, a bank, and a rank.

According to one embodiment, the first through $n^{th}$ memory regions M1 through Mn may have a hierarchical structure. For example, the first memory region M1 may include a higher level memory, and the $n^{th}$ memory region Mn may include a lower level memory. When a memory is of a higher level, the memory may have relatively less capacity and faster response speed, and when a memory is of a lower level, the memory may have relatively larger capacity and slower response speed. Due to this difference, achievable minimum latencies (or maximum latencies) or maximum error correction levels of each memory region may be different from each other.

Therefore, the host may set an error correction option for each of the first through $n^{th}$ memory regions M1 through Mn. In this case, the host may transmit a plurality of error correction option setup messages to the memory controller 821. Each error correction option set message may include a reference latency, a reference error correction level, and an identifier identifying a memory region. Thus, the memory controller 821 may identify a memory region identifier of the error correction option set message, and may set the error correction option for each of the first through $n^{th}$ memory regions M1 through Mn.

As another example, a variable error correction code (ECC) circuit or a fixed ECC circuit may perform an error correction operation according to the memory region where data to be read is stored. For example, data with high importance may be stored in the higher level memory, and more weight may be given to accuracy than latency. Thus, with respect to the data stored in the higher level memory, the operation of the variable ECC circuit may be omitted, and the error correction operation may be performed by the fixed ECC circuit. As another example, data with low importance may be stored in the lower level memory. The data stored in the lower level memory may be given with a weight to the latency thereof, and the operation by the fixed ECC circuit may be omitted. In other words, with respect to a read request for data with low importance, the data may be read immediately after an error correction operation by the variable ECC circuit has been performed or the error correction operation is omitted, and may be transmitted to the host. Depending on the importance of data and the memory region where the data is stored, selective and/or parallel error correction operation may be performed in various ways, and is not limited to the above-described embodiment.

The memory region identifier may also be included in a response message of the memory controller 821. A read request message may include the memory region identifier with an address of read target data. The response message may include the memory region identifier for a memory region including the read data.

Figure 12A:
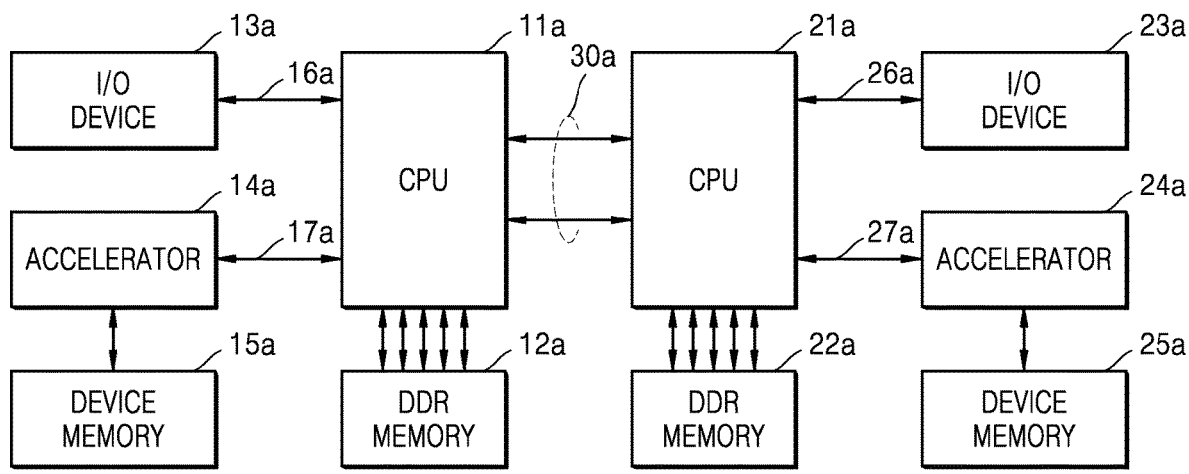
FIG. 12A is a block diagram of a system including multiple central processing units (CPU), according to an embodiment.
Figure 12B:
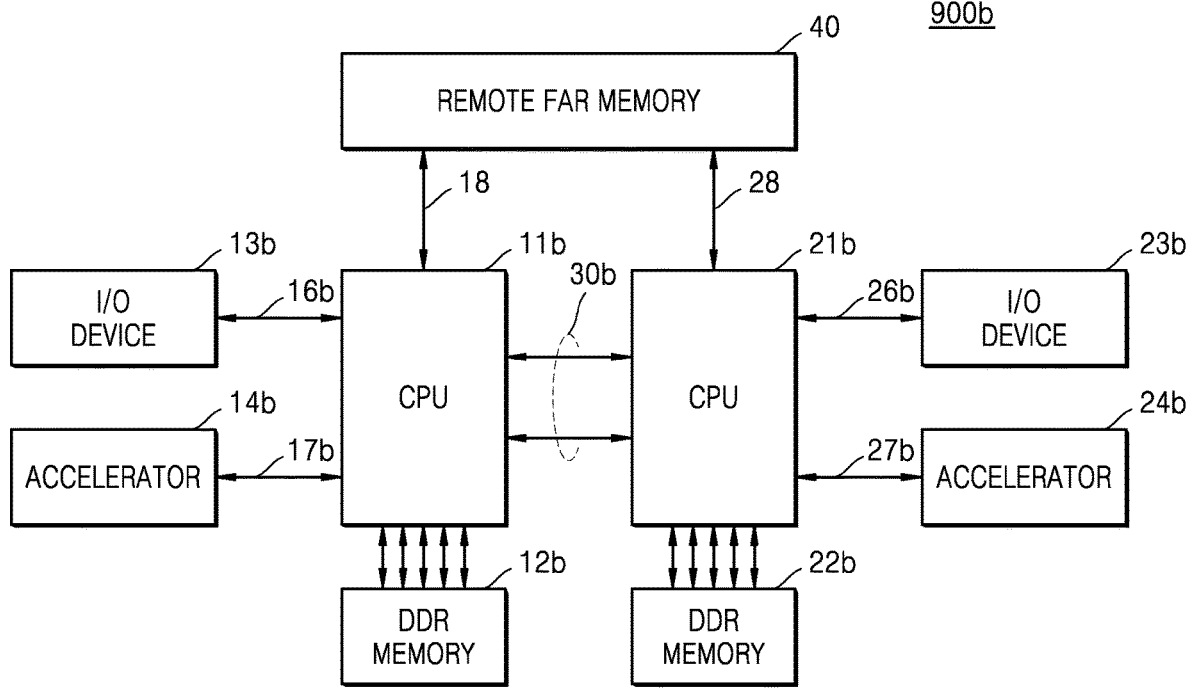
FIG. 12B is a block diagram of a system including multiple CPUs, according to an embodiment.

FIGS. 12A and 12B are block diagrams of examples of systems, according to embodiments.

The block diagrams of FIGS. 12A and 12B represent systems 900a and 900b including multiple CPUs, respectively. Duplicate descriptions will be omitted.

Referring to FIG. 12A, the system 900a may include first and second CPUs 11a and 21a, and first and second double data rates (DDRs) 12a and 22a connected to the first and second CPUs 11a and 21a, respectively. The first and second CPUs 11a and 21a may be connected to each other via an interconnect system 30a based on a processor interconnect technique. As illustrated in FIG. 12A, the interconnect system 30a may provide at least one consistent link between CPUs, that is, CPU-to-CPU.

The system 900a may include a first I/O device 13a and a first accelerator 14a that communicate with the first CPU 11a, and a first device memory 15a connected to the first accelerator 14a. The first CPU 11a and the first I/O device 13a may communicate with each other via a bus 16a, and the first CPU 11a and the first accelerator 14a may communicate with each other via a bus 17a. In addition, the system 900a may include a second I/O device 23a and a second accelerator 24a in communication with the second CPU 21a, and a second device memory 25a connected to the second accelerator 24a. The second CPU 21a and the second I/O device 23a may communicate with each other via a bus 26a, and the second CPU 21a and the second accelerator 24a may communicate with each other via a bus 27a.

Communication based on a protocol may be performed via the buses 16a, 17a, 26a, and 27a, and the protocol may support the selective and/or parallel error correction operations described above with reference to the drawings. Accordingly, the latency, that is required for the error correction operation on a memory, for example, the first device memory 15a, the second device memory 25a, a first DDR memory 12a and/or a second DDR memory 22a, may be reduced, and thus, the performance of the system 900a may be improved.

Referring to FIG. 12B, the system 900b, similar to the system 900a of FIG. 12A, may include first and second CPUs 11b and 21b, first and second DDR memories 12b and 22b, first and second I/O devices 13b and 23b, and first and second accelerators 14b and 24b, and may further include a remote far memory 40. The first and second CPUs 11b and 21b may communicate with each other via an interconnect system 30b. The first CPU 11b and the second CPU 21b may be connected to the first and second I/O devices 13b and 23b via buses 16b and 17b, respectively, and the first CPU 11b and the second CPU 21b may be connected to the first and second accelerators 14b and 24b via the buses 26b and 27b, respectively.

The first and second CPUs 11b and 21b may be connected to the remote far memory 40 via first and second buses 18 and 28, respectively. The remote far memory 40 may be used for expansion of a memory in the system 900b, and the first and second buses 18 and 28 may be used as memory extension ports. The protocol corresponding to the first and second buses 18 and 28, as well as the buses 16b, 17b, 26b, and 27b, may also support the selective and/or parallel error correction operations described above with reference to the drawings. Accordingly, the latency required for the error correction on the remote far memory 40 may be reduced, and the performance of the system 900b may be improved.

Figure 13:
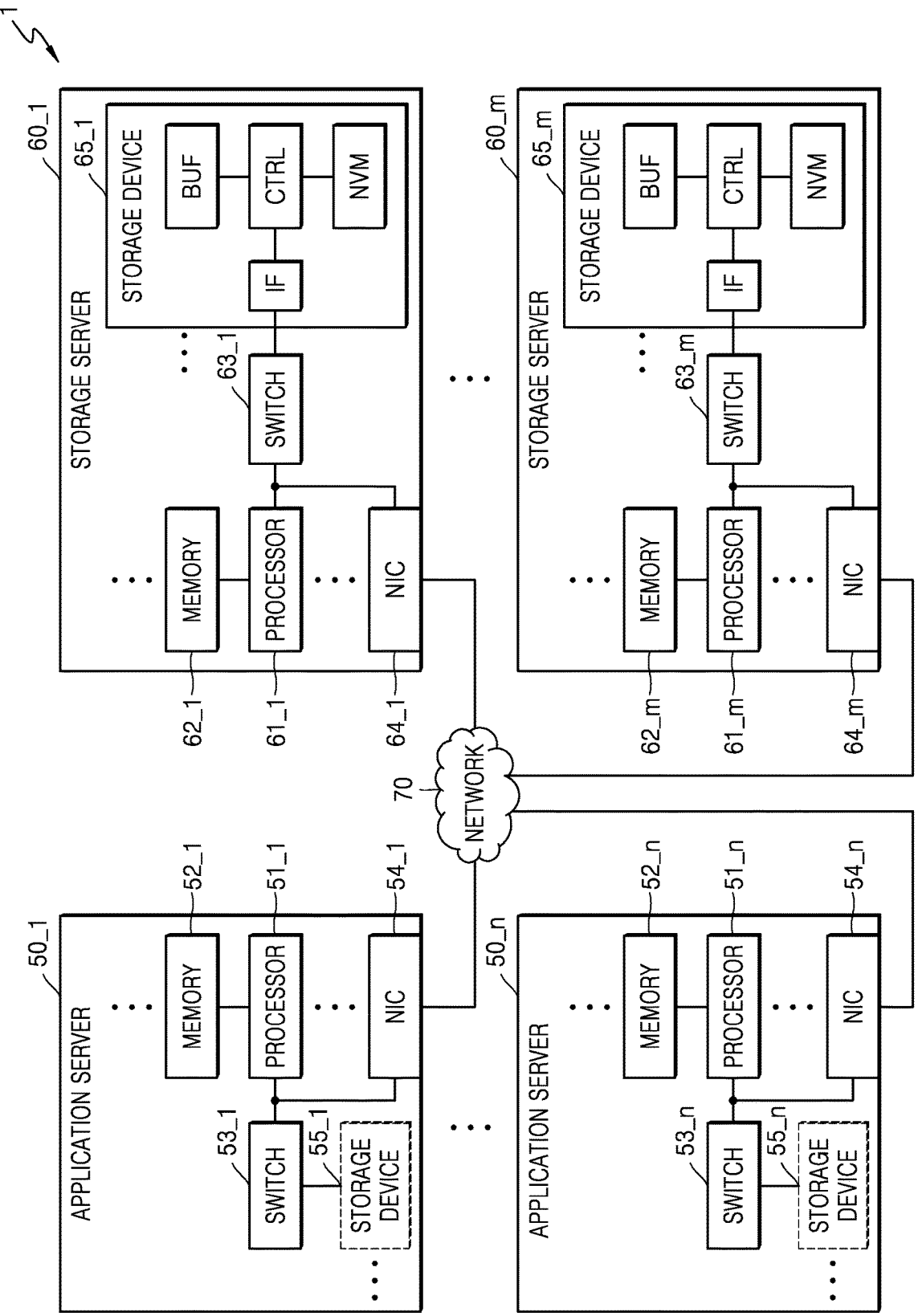
FIG. 13 is a block diagram of a data center including a system, according to an embodiment.

FIG. 13 is a block diagram of a data center including a system, according to an embodiment.

Referring to FIG. 13, the systems described above in some embodiments may be included in a data center 1 as application servers and/or storage servers. In addition, the embodiments related to the selective and/or parallel error correction operations of a memory controller that have been applied to the embodiments may be applied to each of application servers and/or storage servers.

Referring to FIG. 13, the data center 1 may collect various data, provide a service, and may be referred to as a data storage center. For example, the data center 1 may include a system for using a search engine and a database, and may include a computing system used by a corporate such as a bank or a government agency. As illustrated in FIG. 13, the data center 1 may include first through $n^{th}$ application servers 50_1 through 50_n and first through $m^{th}$ storage servers 60_1 through 60_m (n and n are integers greater than 1). The number n of the first through $n^{th}$ application servers 50_1 through 50_n and the number m of the first through $m^{th}$ storage servers 60_1 through 60_m may be variously selected according to embodiments, but the number n of the first through $n^{th}$ application servers 50_1 through 50_n may be different from the number m of the first through $m^{th}$ storage servers 60_1 through 60_m.

The first through $n^{th}$ application servers 50_1 through 50_n may include at least one of first through $n^{th}$ processors 51_1 through 51_n, first through $n^{th}$ memories 52_1 through 52_n, first through $n^{th}$ switches 53_1 through 53_n, first through $n^{th}$ network interface controllers (NICs) 54_1 through 54_n, and first through $n^{th}$ storage devices 55_1 through 55_n. The first through $n^{th}$ processors 5_1 through 51_n may control operations of the first $n^{th}$ application servers 50_1 through 50_n, and may execute instructions and/or data loaded in the first through $n^{th}$ memories 52_1 through 52_n by accessing the first through $n^{th}$ memories 52_1 through 52_n. The first through $n^{th}$ memories 52_1 through 52_n may include, as a non-limiting example, a double data rate (DDR) synchronous DRAM (SDRAM), a high bandwidth memory (HBM), a hybrid memory cube (HMC), a dual in-line memory module (DIMM), an optane DIMM, or a non-volatile DIMM (NVMDIMM).

According to an embodiment, the number of processors and the number of the processors included in the first through $n^{th}$ application servers 50_1 through 50_n may be variously selected. In some embodiments, the first through $n^{th}$ processors 51_1 through 51_n and the first through $n^{th}$ memories 52_1 through 52_n may provide a processor-memory pair. In some embodiments, the number of first through $n^{th}$ processors 51_1 through 51_n may be different from the number of first through $n^{th}$ memories 52_1 through 52_n. The first through $n^{th}$ processors 51_1 through 51_n may include a single core processor or a multi-core processor. In some embodiments, the first through $n^{th}$ storage devices 55_1 through 55_n may be omitted in the first through $n^{th}$ application servers 50_1 through 50_n, as illustrated by a dotted line in FIG. 13. The number of first through $n^{th}$ storage devices 55_1 through 55_n included in the first through $n^{th}$ application servers 50_1 through 50_n may be variously selected according to embodiments. The first through $n^{th}$ processors 51_1 through 51_n, the first through $n^{th}$ memories 52_1 through 52_n, the first through $n^{th}$ switches 53_1 through 53_n, the first through $n^{th}$ NICs 54_1 through 54_n, and the first through $n^{th}$ storage devices 55_1 through 55_n may communicate with each other via links described above with reference to the drawings.

First through $m^{th}$ storage servers 60_1 through 60_m may include at least one of first through $m^{th}$ processors 61_1 through 61_m, first through $m^{th}$ memories 62_1 through 62_m, first through $m^{th}$ switches 63_1 through 63_m, first through $m^{th}$ NICs 64_1 through 64_m, and first through $m^{th}$ storage devices 65_1 through 65_m. The first through $m^{th}$ processors 61_1 through 61_m and the first through $m^{th}$ memories 62_1 through 62_m may operate similarly as the first through $n^{th}$ processors 51_1 through 51_n and the first through $n^{th}$ memories 52_1 through 52_n of the first through $n^{th}$ application servers 50_1 through 50_n, respectively.

The first through $n^{th}$ application servers 50_1 through 50_n and the first through $m^{th}$ storage servers 60_1 through 60_m may communicate with each other via a network 70. In some embodiments, the network 70 may be implemented by using a fiber channel (FC), Ethernet, or the like. The FC may include a medium used for relatively high speed data transmission, and may use an optical switch that provides high performance/high availability. According to an access method of the network 70, the first through $m^{th}$ storage servers 60_1 through 60_m may be provided as file storages, block storages, or object storages.

In some embodiments, the network 70 may include a storage-dedicated network such as a storage area network (SAN). For example, the SAN may include a FC-SAN that is capable of using an FC network and implemented according to FC protocol (FCP). Alternatively, the SAN may include an internet protocol (IP) SAN (IP_SAN) that is capable of using transmission control protocol (TCP)/IP and implemented according to an internet small computer system interface (SCSI) (iSCSI) (that is, SCSI over TCP/IP or internet SCSI) protocol. In some embodiments, the network 70 may include a general network such as the TCP/IP network. For example, the network 70 may be implemented according to a protocol such as FC over Ethernet (FCoE), a network-attached storage (NAS), and a node version manager (NVM) express (NVMe) over fabrics (oF) (NVMe-oF).

Hereinafter, the first application server 50_1 and the first storage server 60_1 will be mainly described, but it is noted that a description of the first application server 50_1 may also be applied to other application servers (for example, 50_n), and a description of the first storage server may also be applied to other storage servers (for example, 60_m).

The first application server 50-1 may store data requested by the user or client to be stored in one of the first through $m^{th}$ storage servers 60_1 through 60_m via the network 70. In addition, the first application server 50_1 may obtain data requested by the user or client to be read from one of the first through $m^{th}$ storage servers 60_1 through 60_m via the network 70. For example, the first application server 50_1 may be implemented as a web server, a database management system (DBMS), or the like.

The first application server 50_1 may access the $n^{th}$ memory 52_n and/or the $n^{th}$ storage device 55_n included in the $n^{th}$ application server 50_n via the network 70, and/or may access the first through $m^{th}$ memories 62_1 through 62_m and/or the first through $m^{th}$ storage devices 65_1 through 65_m included in the first through $m^{th}$ storage servers 60_1 through 60_m via the network 70. Accordingly, the first application server 50_1 may perform various operations on data stored in the first through $n^{th}$ application servers 50_1 through 50_n and/or the first through $m^{th}$ storage servers 60_1 through 60_m. For example, the first application server 50_1 may execute a command for moving or copying data between the first through $n^{th}$ application servers 50_1 through 50_n and/or the first through $m^{th}$ storage servers 60_1 through 60_m. In this case, data may be moved from the first through $m^{th}$ storage devices 65_1 through 65_m of the first through $m^{th}$ storage servers 60_1 through 60_m via first through $m^{th}$ memories 62_1 through 62_m or directly to the first through $n^{th}$ memories 52_1 through 52_n of the first through $n^{th}$ application servers 50_1 through 50_n. In some embodiments, data being moved via the network 70 may be data encrypted for security or privacy.

In the first storage server 60_1, an interface IF may provide a physical connection between the first processor 61_1 and a controller CTRL and a physical connection between the first NIC 64_1 and the controller CTRL. For example, the interface IF may be implemented in a direct attached storage (DAS) method of directly connecting the first storage device 65_1 by using a dedicated cable. In addition, for example, the interface I/F may be implemented in various interface methods such as advanced technology attachment (ATA), serial ATA (SATA), external SATA (e-SATA), small computer system interface (SCSI), serial attached SCSI (SAS), peripheral component interconnect (PCI), PCI express (PCIe), node version manager (NVM) express (NVMe), IEEE 1394, universal serial bus (USB), a secure digital (SD) card, a multi-media card (MMC), an embedded multi-media card (eMMC), universal flash storage (UFS), embedded universal flash storage (eUFS), and a compact flash (CF) card.

In the first storage server 60_1, the first switch 63_1 may, according to a control of the first processor 61_1, selectively connect the first processor 61_1 to the first storage device 65_1, or the first NIC 64_1 to the first storage device 65_1.

In some embodiments, the first NIC 64_1 may include a network interface card, a network adapter, or the like. The first NIC 64_1 may be connected to the network 70 via a wired interface, a wireless interface, a Bluetooth interface, an optical interface, or the like. The first NIC 64_1 may include an internal memory, a digital signal processor (DSP), a host bus interface, or the like, and may be connected to the first processor 61_1 and/or the first switch 63_1 via a host bus interface. In some embodiments, the first NIC 64_1 may be integrated with at least one of the first processor 61_1, the first switch 63_1, and the first storage device 65_1.

In the first through $n^{th}$ application servers 50_1 through 50_n or the first through $m^{th}$ storage servers 60_1 through 60_m, the first through $n^{th}$ processors 50_1 through 50_n or the first through $m^{th}$ processors 61_1 through 61_m may program or read data by transmitting a command to the first through $n^{th}$ application servers 55_1 through 55_n or the first through $m^{th}$ application servers 65_1 through 65_m, or the first through $n^{th}$ memories 52_1 through 52_n or the first through $m^{th}$ memories 62_1 through 62_m, respectively. In this case, the data may be an error-corrected data processed by an error checking and correcting (ECC) engine. The data may be data processed by data bus inversion (DBI) or data masking (DM), and may include cyclic redundancy code (CRC) information. The data may be data encrypted data for security or privacy.

The first through $n^{th}$ storage devices 55_1 through 55_n or the first through $m^{th}$ storage devices 65_1 through 65_m may, in response to the read command READ CMD read from the first through $n^{th}$ processors 51_1 through 51_n or the first through $m^{th}$ processors 61_1 through 61_m, transmit control signals and command and/or address signals to a NVM (for example, NAND flash memory device), respectively. Accordingly, when data is read from the non-volatile memory device NVM, a read enable signal may be input as a data output control signal, and may output the data to a DQ bus. A data strobe signal may be generated by using the read enable signal. The command and address signal may be latched according to a rising edge or falling edge of a write enable signal.

The controller CTRL may control operations of one of the first through $m^{th}$ storage devices 65_1 through 65_$m$. In an embodiment, the controller CTRL may include static random access memory (RAM) (SRAM). The controller CTRL may, in response to the write command, write data to the non-volatile memory device NVM, or, in response to the read command, may read data from the non-volatile memory device NVM. For example, the write command and/or read command may be generated based on a request provided from a host, for example, the first processor 61_1 in the first storage server 60_1, the $m^{th}$ processor 61_$m$ in the $m^{th}$ storage server 60_$m$, or the first through $n^{th}$ processors 51_1 through 51_$n$ in the first through $n^{th}$ application servers 50_1 through 50_$n$. A buffer BUF may temporarily store (buffer) data to be written in the non-volatile memory device NVM or data read from the non-volatile memory device NVM. In some embodiments, the buffer BUF may include a dynamic RAM (DRAM). In addition, the buffer BUF may store meta data, and the meta data may be referred to as user's data or data generated in the controller CTRL for managing the non-volatile memory device NVM. The first storage device 65_1 may include secure element (SE) for security or privacy.

At least one of the components, elements, modules or units (collectively "components" in this paragraph) represented by a block in the drawings may be embodied as various numbers of hardware, software and/or firmware structures that execute respective functions described above, according to an example embodiment. According to example embodiments, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

While the inventive concept has been particularly shown and described with reference to example embodiments thereof, it will be understood that various changes in form and details may be made therein without departing from the spirit and scope of the following claims.

What is claimed is:

1. A device comprising:
   a first interface circuit configured to communicate with a host processor;
   a second interface circuit configured to communicate with a memory comprising a plurality of storage regions;
   a cache memory comprising a plurality of cache lines configured to temporarily store data; and
   a controller configured to receive an integrated command from the host processor, the integrated command comprising memory operation information and cache management information, configured to control the memory based on a first command that is instructed according to the memory operation information, and configured to control at least one of the plurality of cache lines based on the cache management information,
   wherein the memory operation information of the integrated command corresponds to a read command for a first piece of data,
   wherein the cache management information is generated by the host processor requesting to the controller of the device to perform at least one of a cache flush, a cache keep, or a prefetching, and
   wherein the controller is further configured to:
   (i) output the first piece of data based on the cache management information instructing the cache flush; and
   (ii) in response to outputting the first piece of data to the host processor, perform the cache flush to clear a first cache line, which stores the first piece of data, among the plurality of cache lines based on the cache management information.

2. The device of claim 1, wherein the integrated command further comprises additional management information, and wherein the controller comprises:
   a garbage collection unit configured to perform garbage collection on the memory based on the additional management information instructing the garbage collection;
   a wear leveling unit configured to perform wear leveling on the memory based on the additional management information instructing the wear leveling;
   a cache management unit configured to perform at least one of the cache flush or the cache keep on the cache memory based on the cache management information instructing the at least one of the cache flush or the cache keep; and
   a prefetching unit configured to prefetch data read from the memory to the cache memory based on the cache management information instructing prefetching.

3. The device of claim 2, wherein the controller is further configured to:
   transmit a read command for a second piece of data to the memory based on the memory operation information,
   based on the cache management information instructing the cache keep, control the cache memory to bypass overwriting on a second cache line, which stores the second piece of data, among the plurality of cache lines, and
   determines a cache hit based on the read command for the second piece of data being received after bypassing the overwriting.

4. The device of claim 2, wherein the controller is further configured to:
   transmit the read command for the first piece of data to the memory based on the memory operation information; and
   output the first piece of data, received from the memory, to the host processor,
   based on the cache management information instructing the cache flush, control the cache memory to clear the first cache line, which stores the first piece of data, among the plurality of cache lines.

5. The device of claim 4, wherein the controller is further configured to, based on the first cache line being cleared, control the memory according to the additional management information so that the garbage collection is performed on a storage region, which stores the first piece of data, among the plurality of storage regions.

6. The device of claim 2, wherein the controller is further configured to:
   transmit, to the memory, the read command for the first piece of data based on the memory operation information;
   transmit, to the memory, a prefetching command for a second piece of data based on the cache management information, wherein the second piece of data corresponds to a lower node of the first piece of data in a tree-type data structure comprising a plurality of nodes;
   store, to the cache memory, the second piece of data prefetched from the memory; and
   determine a cache hit based on the read command for the second piece of data being received from the host processor after prefetching of the second piece of data.

7. The device of claim 6, wherein the cache management information further comprises information requesting to prefetch data stored in at least two storage regions of the plurality of storage regions.

8. The device of claim 1, wherein the device is connected to the host processor via a bus, and
   wherein the first interface circuit is further configured to communicate with the host processor based on a protocol of the bus.

9. The device of claim 1, wherein the cache management information is generated by the host processor, based on at least one of a type of an application in operation, a statistic of an input and/or output of data in the application, or a usage pattern of the application.

10. A system comprising:
    a host processor comprising at least one core configured to execute instructions;
    a device-attached memory comprising a plurality of storage regions; and
    a device configured to communicate with the host processor and the device-attached memory,
    wherein the device comprises a cache memory and is further configured to control the cache memory and the device-attached memory based on an integrated command, received from the host processor, the integrated command comprising a read command for a first piece of data in the device-attached memory and cache management information for the cache memory,
    wherein the cache management information is generated by the host processor requesting to the device to perform at least one of a cache flush, a cache keep, or a prefetching, and
    wherein the device is further configured to:
    (i) output the first piece of data based on the cache management information instructing the cache flush; and
    (ii) in response to outputting the first piece of data to the host processor, perform the cache flush to clear a first cache line, which stores the first piece of data, among a plurality of cache lines based on the cache management information.

11. The system of claim 10, wherein the cache memory comprises the plurality of cache lines configured to store data read from the device-attached memory, and
    wherein, based on the cache management information instructing the cache keep of the first piece of data, the device is further configured to:
    according to the read command, receive the first piece of data from the device-attached memory, store the first piece of data on the first cache line among the plurality of cache lines, and perform the cache keep of the first piece of data; and
    determine a cache hit based on the read command for the first piece of data being received after the cache keep.

12. The system of claim 10, wherein the device is further configured to, according to the read command included in the integrated command, receive the first piece of data from the device-attached memory, store the first piece of data on the first cache line among the plurality of cache lines of the cache memory, output the first piece of data received from the device-attached memory to the host processor, and based on the integrated command comprising the cache management information instructing the cache flush, control the cache memory to clear the first cache line that stores the first piece of data in response to outputting the first piece of data to the host processor.

13. The system of claim 12, wherein the device further comprises a mapping table in which the cache management information instructing the cache flush is mapped to at least one of garbage collection or wear leveling,
    wherein the device is further configured to control to perform the at least one of the garbage collection or the wear leveling for the first piece of data based on the mapping table and the cache management information instructing the cache flush.

14. The system of claim 10, wherein the device is further configured to:
    based on the cache management information, transmit a prefetching command for a second piece of data to the device-attached memory, the second piece of data corresponding to a lower node of the first piece of data in a tree-type data structure comprising a plurality of nodes; and
    store the second piece of data, read from the device-attached memory, on a cache line among the plurality of cache lines of the cache memory, output the first piece of data read from the device-attached memory to the host processor, and determine a cache hit based on a read command for the second piece of data being received from the host processor after storing the second piece of data.

15. The system of claim 14, wherein the cache management information further comprises information requesting prefetching of data stored in at least two storage regions among the plurality of storage regions, and
    wherein the cache management information further comprises information instructing a prefetching order for the at least two storage regions.

16. The system of claim 10, wherein the host processor is, via the device and a bus, connected to and configured to communicate with the device based on a protocol of the bus, and
    wherein the protocol comprises at least compute express link (CXL) protocol.

17. The system of claim 10, wherein the cache management information is generated by the host processor, based on at least one of a type of an application in operation, a statistic of an input and/or output of data in the application, or a usage pattern of the application.

18. A method of operating a device connected to a host processor via a bus and connected to a device-attached memory, the device-attached memory comprising a plurality of storage regions, the method comprising:

receiving, from the host processor, an integrated command comprising memory operation information and cache management information;

according to the memory operation information, transmitting a read command for a first piece of data to the device-attached memory; and according to the cache management information, controlling a cache memory included in the device, the cache memory comprising a plurality of cache lines, wherein the cache management information is generated by the host processor and instructs at least one of a cache keep on a first cache line that temporarily stores the first piece of data among the plurality of cache lines, a cache flush on the first cache line, or prefetching of a second piece of data that is different from the first piece of data, and wherein the method further comprises:

(i) outputting the first piece of data based on the cache management information instructing the cache flush, and (ii) in response to outputting the first piece of data to the host processor, performing the cache flush to clear the first cache line based on the cache management information.

19. The method of claim 18, further comprising:
based on the cache management information instructing the cache flush, transmitting, to the device-attached memory, a control signal instructing garbage collection on a storage region corresponding to the first piece of data among the plurality of storage regions.

20. The method of claim 18, further comprising:
based on the cache management information instructing prefetching of the second piece of data, storing the second piece of data on a second cache line among the plurality of cache lines;

after outputting of the first piece of data, receiving a read command for the second piece of data; and based on the read command for the second piece of data, determining a cache hit, and outputting the second piece of data stored on the second cache line among the plurality of cache lines to the host processor.

* * * * *